(12) United States Patent
Ikami

(10) Patent No.: US 6,504,167 B2
(45) Date of Patent: Jan. 7, 2003

(54) IMAGE READING APPARATUS

(75) Inventor: Seishi Ikami, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 92 days.

(21) Appl. No.: 09/832,791

(22) Filed: Apr. 12, 2001

(65) Prior Publication Data
US 2001/0030303 A1 Oct. 18, 2001

(30) Foreign Application Priority Data

Apr. 13, 2000 (JP) ........................................ 2000-111541
Jun. 13, 2000 (JP) ........................................ 2000-176823

(51) Int. Cl.$^7$ ............................................... G03B 42/02
(52) U.S. Cl. ........................................ 250/584; 250/585
(58) Field of Search .................................. 250/584, 585, 250/586, 234, 231.16, 236, 483.1, 458.1; 356/318; 422/82.05

(56) References Cited

U.S. PATENT DOCUMENTS 6,326,628 B1 * 12/2001 Kimura et al. ............ 250/458.1
6,333,499 B1 * 12/2001 Sato .......................... 250/234
2001/0024834 A1 * 9/2001 Kimura ...................... 436/518
2002/0117632 A1 * 8/2002 Hakamata et al. ......... 250/458.1

FOREIGN PATENT DOCUMENTS

JP         2002072393 A * 3/2002 ........... G03B/42/02

* cited by examiner

Primary Examiner—Constantine Hannaher
Assistant Examiner—Otilia Gabor
(74) Attorney, Agent, or Firm—Sughrue Mion, PLLC

(57) ABSTRACT

An image reading apparatus includes a laser stimulating ray source for emitting a laser beam, a stage on which an image carrier can be placed, a scanning mechanism for scanning the image carrier with the laser beam emitted from the laser stimulating ray source, thereby stimulating the image carrier with the laser beam, a light detector for photoelectrically detecting light emitted from the image carrier, and an optical head for leading the laser beam emitted from the laser stimulating ray source to the image carrier, irradiating the image carrier with the laser beam and leading light emitted from the image carrier to the light detector, the optical head being constituted so as to lead light emitted from a point of the image carrier located upstream of a point of the image carrier onto which the laser beam impinges with respect to a direction of scanning with the laser beam. The thus constituted image reading apparatus can efficiently read a fluorescent image at a high S/N ratio by detecting residual fluorescence released from a fluorescent substance after the completion of irradiation with a stimulating ray.

25 Claims, 16 Drawing Sheets

⇨ MAIN SCANNING DIRECTION

V1 m/sec

IMAGE READING APPARATUS

BACKGROUND OF THE INVENTION

The present invention relates to an image reading apparatus and, particularly, to such an apparatus which can efficiently read a fluorescent image with a high S/N ratio by detecting residual fluorescence released from a fluorescent substance after the completion of irradiation with a stimulating ray.

DESCRIPTION OF THE PRIOR ART

An autoradiographic image detecting system using as a detecting material for detecting radiation a stimulable phosphor which can absorb, store and record the energy of radiation when it is irradiated by radiation and which, when it is then stimulated by an electromagnetic wave having a specified wavelength, can release stimulated emission whose light amount corresponds to the amount of radiation with which it was irradiated is known, which comprises the steps of introducing a radioactively labeled substance into an organism, using the organism or a part of the tissue of the organism as a specimen, placing the specimen and a stimulable phosphor sheet formed with a stimulable phosphor layer together in layers for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see, for example, Japanese Patent Publication No. 1-60784, Japanese Patent Publication No. 1-60782, Japanese Patent Publication No. 4-3952 and the like).

There are further known an electron microscopic image detecting system and a radiographic diffraction image detecting system comprising the steps of employing, as a detecting material for an electron beam or radiation, a stimulable phosphor which can absorb and store the energy of an electron beam or radiation upon being irradiated therewith and release a stimulated emission whose amount is proportional to that of the received electron beam or radiation upon being stimulated with an electromagnetic wave having a specific wavelength range, irradiating a metal or nonmetal specimen with an electron beam and effecting elemental analysis, composition analysis or structural analysis of the specimen by detecting a diffraction image or a transmission image, or irradiating the tissue of an organism with an electron beam and detecting an image of the tissue of the organism, or irradiating a specimen with radiation, detecting a radiographic diffraction image and effecting structural analysis of the specimen (see, for example, Japanese Patent Application Laid Open No. 61-51738, Japanese Patent Application Laid Open No. 61-93538, Japanese Patent Application Laid Open No. 59-15843 and the like).

Unlike the system using a photographic film, according to these systems using the stimulable phosphor as a detecting material for an image, development, which is chemical processing, becomes unnecessary. Further, it is possible reproduce a desired image by effecting image processing on the obtained image data and effect quantitative analysis using a computer. Use of a stimulable phosphor in these processes is therefore advantageous.

On the other hand, a fluorescent image detecting system using a fluorescent substance as a labeling substance instead of a radioactively labeling substance in the autoradiographic image detecting system is known. According to this system, it is possible to study a genetic sequence, study the expression level of a gene, and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed, or distributing a plurality of DNA fragments on a gel support containing a fluorescent dye, or dipping a gel support on which a plurality of DNA fragments have been distributed by means of electrophoresis in a solution containing a fluorescent dye, thereby labeling the electrophoresed DNA fragments, exciting the fluorescent dye by a stimulating ray to cause it to release fluorescence, detecting the released fluorescence to produce an image and detecting the distribution of the DNA fragments on the gel support. This system can also perform a process including the steps of distributing a plurality of DNA fragments on a gel support by means of electrophoresis, denaturing the DNA fragments, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release fluorescence, detecting the released fluorescence to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substance, transforming the fluorescent substance to a fluorescent substance having fluorescence releasing property, exciting the thus produced fluorescent substance by a stimulating ray to release fluorescence, detecting the fluorescence to produce an image and detecting the distribution of the target DNA on the transfer support. This fluorescence detecting system is advantageous in that a genetic sequence or the like can be easily detected without using a radioactive substance.

Similarly, there is known a chemiluminescence detecting system comprising the steps of fixing a substance derived from a living body such as a protein or a nucleic acid sequence on a support, selectively labeling the substance derived from a living body with a labeling substance which generates chemiluminescent emission when it contacts a chemiluminescent substance, contacting the substance derived from a living body and selectively labeled with the labeling substance and the chemiluminescent substance, photoelectrically detecting the chemiluminescent emission in the wavelength of visible light generated by the contact of the chemiluminescent substance and the labeling substance to produce digital image signals, effecting image processing thereon, and reproducing a chemiluminescent image on a display means such as a CRT or a recording material such as a photographic film, thereby obtaining information relating to the high molecular substance such as genetic information Since the autoradiographic image detecting system, the electron microscopic image detecting system, the radiographic diffraction image detecting system, the fluorescent image detecting system and the chemiluminescent image detecting system are used for the similar purposes, it is desirable to develop an image reading apparatus which can be used in common for all of these systems.

In fact, an image reading apparatus which can be used in common for the autoradiographic image detecting system, the chemiluminescent image detecting system, the electron microscopic image detecting system and the radiographic diffraction image detecting system using a stimulable phosphor sheet, and the fluorescent image detecting system has been already developed.

These system are constituted so as to excite a stimulable phosphor or a fluorescent substance with a stimulating ray and photoelectrically detect stimulated emission or fluorescence by a light detector, thereby producing an image. Therefore, since noise is produced if the stimulating ray is detected by the light detector, an image reading apparatus for these systems is constituted to use an optical filter to cut the stimulating ray and prevent the stimulating ray from entering the light detector.

However, since it is difficult to perfectly preventing the stimulating ray from entering the light detector, a fluorescent image detecting system has been proposed which detects residual fluorescence released from the fluorescent substance after the completion of stimulation by the stimulating ray, thereby eliminating the effect of the stimulating ray and improving the S/N ratio.

This system enables the fluorescent image detecting system to eliminate the effect of the stimulating ray and improve the S/N ratio by detecting residual fluorescence. However, a conventional image reading apparatus for the fluorescent image detecting system is often constituted to be used in common with an autoradiographic image detecting system, a chemiluminescent image detecting system, an electron microscopic image detecting system and a radiographic diffraction image detecting system using a stimulable phosphor sheet. Since the intensity of stimulated emission released from a stimulable phosphor quickly decreases after the irradiation with a stimulating ray in the autoradiographic image detecting system, the chemiluminescent image detecting system, the electron microscopic image detecting system and the radiographic diffraction image detecting system using a stimulable phosphor sheet, the image reading apparatus is constituted so as to immediately photoelectrically detect stimulated emission and fluorescence released upon stimulation. Therefore, when residual fluorescence is detected, a stimulating ray source has to be mechanically turned on and off to scan a transfer support or a gel support with a stimulating ray and residual fluorescence has to be detected during the period when the stimulating ray source is off.

However, even when the stimulating ray source is mechanically turned on and off using four vanes directly connected to a motor and rotated at 12000 r.p.m., the on-and-off cycle is on the millisecond order and when fluorescence is detected by turning on and off the stimulating ray source in accordance with such a slow cycle, it takes very long time to scan the whole surface of the transfer support or the gel support with the stimulating ray. Such a system is therefore not efficient.

SUMMARY OF THE INVENTION

It is therefore an object of the present invention to provide an image reading apparatus which can efficiently read a fluorescent image at a high S/N ratio by detecting residual fluorescence released from a fluorescent substance after the completion of irradiation with a stimulating ray.

The above and other objects of the present invention can be accomplished by an image reading apparatus comprising at least one laser stimulating ray source for emitting a laser beam, a stage on which an image carrier can be placed, a scanning mechanism for scanning the image carrier with the laser beam emitted from the at least one laser stimulating ray source, thereby stimulating the image carrier with the laser beam, a light detector for photoelectrically detecting light emitted from the image carrier, and an optical head for leading the laser beam emitted from the at least one laser stimulating ray source to the image carrier, irradiating the image carrier with the laser beam and leading light emitted from the image carrier to the light detector, the optical head being constituted so as to lead light emitted from a point of the image carrier located upstream of a point of the image carrier onto which the laser beam impinges with respect to a direction of scanning with the laser beam.

In the present invention, "point of the image carrier located upstream of a point of the image carrier onto which the laser beam impinges with respect to a direction of scanning with the laser beam" as termed here means a point on the image carrier onto which the laser beam has already impinged, regardless of whether the laser beam is moved or the image carrier is moved by the scanning mechanism. Further, "residual fluorescence" as termed with respect to the present invention means fluorescence released from a fluorescent substance after completion of irradiation by a stimulating ray.

According to the present invention, since the optical head for leading the laser beam emitted from the at least one laser stimulating ray source to the light detector, irradiating the image carrier with the laser beam and leading light emitted from the image carrier to the light detector is constituted so as to lead light emitted from a point of the image carrier located upstream of the point of the image carrier onto which the laser beam impinges with respect to the direction of scanning with the laser beam, light released from the image carrier, led to the light detector by the optical head and photoelectrically detected by the light detector is light released from a portion of the image carrier which was excited by the laser beam and is no longer irradiated by the laser beam as a result of the scanning of the laser beam. Therefore, residual fluorescence can be photoelectrically detected without turning on and off the laser stimulating ray source, thereby efficiently producing a fluorescent image with a high S/N ratio.

In a preferred aspect of the present invention, the optical head further includes a stimulating ray condensing optical system for condensing a laser beam emitted from the at least one laser stimulating ray source onto the image carrier and a detected light condensing optical system disposed downstream of the stimulating ray condensing optical system with respect to the direction of the scanning with the laser beam for condensing light released from the image carrier and leading it to the light detector.

In a further preferred aspect of the present invention, the stimulating ray condensing optical system and the detected light condensing optical system are provided so that their optical axes are parallel.

In a further preferred aspect of the present invention, the stimulating ray condensing optical system and the detected light condensing optical system are provided so that their axes lie at a predetermined angle to each other.

According to this preferred aspect of the present invention, the stimulating ray condensing optical system and the detected light condensing optical system can be disposed without space constraints so that residual fluorescence can be detected shortly after completion of irradiation by the laser beam. It is therefore possible to detect a great amount of residual fluorescence, despite its being emitted only for a short period.

In a further preferred aspect of the present invention, an aperture is provided between the stimulating ray condensing optical system and the detected light condensing optical system so that the center thereof coincides with the center of the path of light released from the image carrier and only light released from the image carrier and to be detected by the light detector is allowed to pass therethrough.

According to this preferred aspect of the present invention, since the aperture is provided between the stimulating ray condensing optical system and the detected light condensing optical system so that the center thereof coincides with the center of the path of light released from the image carrier and only light released from the image carrier and to be detected by the light detector is allowed to pass therethrough, it is possible to cut the stimulating ray, thereby reducing noise in the image data and producing image data based on which an image having high resolution can be reproduced.

In another preferred aspect of the present invention, the optical head further comprises a first mirror for directing a laser beam emitted from at least one laser stimulating ray source to the image carrier, a condensing optical system for condensing light released from the image carrier, a second mirror whose center portion is formed so as to transmit the laser beam and which is adapted for reflecting light condensed by the condensing optical system and leading the light to the light detector and angle adjusting means for adjusting the angle of the first mirror.

According to this preferred aspect of the present invention, residual fluorescence released from a portion of the image carrier which was excited by the laser beam and as a result of the scanning of the laser beam is no longer irradiated by the laser beam can be condensed by the condensing optical system by adjusting the angle of the first mirror using the angle adjusting means so that the laser beam is impinged onto a portion of the image carrier located downstream of a portion of the image carrier facing the center of the condensing optical system with respect to the scanning direction of the laser beam and is led to the light detector by the second mirror, thereby causing the light detector to photoelectrically detect it. Therefore, a fluorescent image can be efficiently produced at a high S/N ratio by photoelectrically detecting residual fluorescence. On the other hand, a stimulable phosphor layer formed on a stimulable phosphor sheet can be stimulated with a laser beam by adjusting the angle of the first mirror using the angle adjusting means so as to direct the laser beam to the center of the condensing optical system and stimulated emission released from the stimulable phosphor layer formed on the stimulable phosphor sheet can be condensed by the condensing optical system and led to the light detector by the second mirror, thereby causing the light detector to photoelectrically detect it. Therefore, the image reading apparatus can be used in common for an autoradiographic image detecting system, a chemiluminescent image detecting system, an electron microscopic image detecting system and a radiographic diffraction image detecting system using a stimulable phosphor sheet and a fluorescent image detecting system.

In a further preferred aspect of the present invention, the second mirror is constituted as a perforated mirror whose center portion is formed with a hole.

In a further preferred aspect of the present invention, an aperture is provided between the second mirror and the light detector so that the center thereof coincides with the center of the path of light released from the image carrier and only light released from the image carrier and to be detected by the light detector is allowed to pass therethrough.

According to this preferred aspect of the present invention, since the aperture is provided between the second mirror and the light detector so that the center thereof coincides with the center of the path of light released from the image carrier and only light released from the image carrier and to be detected by the light detector is allowed to pass therethrough, it is possible to cut the stimulating ray, thereby reducing noise in the image data and producing image data based on which an image having high resolution can be reproduced.

In another preferred aspect of the present invention, the optical head further comprises a first mirror for directing a laser beam emitted from at least one laser stimulating ray source to the image carrier, a first condensing optical system for condensing light directed by the first mirror to the image carrier onto the image carrier, a second mirror whose center portion is located on an extension of the path of the laser beam impinging on the first mirror and which is located upstream of the first mirror with respect to the scanning direction of the laser beam and is adapted for directing the laser beam emitted from the at least one laser stimulating ray source to the image carrier, a second condensing optical system located upstream of the first condensing optical system with respect to the scanning direction of the laser beam and adapted for condensing light released from the image carrier, and a third mirror whose center portion is formed so as to transmit the laser beam and which is adapted for reflecting light condensed by the second condensing optical system and leading the light to the light detector, the second mirror being adapted for directing the laser beam emitted from the at least one laser stimulating ray source to the center portion of the third mirror and the center of the second condensing optical system, the optical system further comprising angle adjusting means for adjusting the angle of the first mirror, thereby enabling the first mirror to be selectively located in the path of the laser beam emitted from the at least one laser stimulating ray source or retracted therefrom.

According to this preferred aspect of the present invention, the laser beam emitted from the laser stimulating ray source can be led to the first condensing optical system and condensed onto the image carrier by locating the first mirror in the path of the laser beam, and light released from the image carrier can be condensed by the second condensing optical system disposed upstream of the first condensing optical system with respect to the scanning direction of the laser beam, reflected by the third mirror and led to the light detector. Therefore, since residual fluorescence released from a portion of the image carrier which was excited by the laser beam and as a result of the scanning of the laser beam is no longer irradiated by the laser beam can be led to and photoelectrically detected by the light detector, a fluorescent image can be efficiently produced at a high S/N ratio by photoelectrically detecting residual fluorescence. On the other hand, a stimulable phosphor layer formed on a stimulable phosphor sheet can be stimulated by a laser beam by adjusting the angle of the first mirror using the angle adjusting means so as to retract the first mirror from the path of the laser beam emitted from the laser stimulating ray source, lead the laser beam emitted from the laser stimulating ray source to the second mirror, cause the laser beam to pass through the center portion of the third mirror and the center of the second condensing optical system and lead the laser beam to the image carrier, and stimulated emission released from the stimulable phosphor layer formed on the stimulable phosphor sheet can be condensed by the second condensing optical system and led to the light detector by the third mirror, thereby causing the light detector to photoelectrically detect it. Therefore, the image reading apparatus can be used in common for an autoradiographic image detecting system, a chemiluminescent image detecting system, an electron microscopic image detecting system and a radiographic diffraction image detecting system using a stimulable phosphor sheet and a fluorescent image detecting system.

In a further preferred aspect of the present invention, the first condensing optical system, the first mirror, the second mirror, the third mirror and the second condensing optical system are disposed so that the optical axis of the first condensing optical system and the optical axis of the second condensing optical system are parallel to each other.

In another preferred aspect of the present invention, the first condensing optical system, the first mirror, the second mirror, the third mirror and the second condensing optical system are disposed so that the optical axis of the first condensing optical system and the optical axis of the second condensing optical system lie at a predetermined angle to each other.

According to this preferred aspect of the present invention, the first condensing optical system, the first mirror, the second mirror, the third mirror and the second condensing optical system can be disposed without space constraints so that residual fluorescence can be detected shortly period after completion of irradiation by the laser beam. It is therefore possible to detect a great amount of residual fluorescence, despite its being emitted only for a short period.

In a further preferred aspect of the present invention, the second mirror is constituted as a perforated mirror whose center portion is formed with a hole.

In a further preferred aspect of the present invention, an aperture is provided between the third mirror and the light detector so that the center thereof coincides with the center of the path of light released from the image carrier and only light released from the image carrier and to be detected by the light detector is allowed to pass therethrough.

According to this preferred aspect of the present invention, since the aperture is provided between the third mirror and the light detector so that the center thereof coincides with the center of the path of light released from the image carrier and only light released from the image carrier and to be detected by the light detector is allowed to pass therethrough, it is possible to cut the stimulating ray, thereby reducing noise in the image data and producing image data based on which an image having high resolution can be reproduced.

In another preferred aspect of the present invention, the optical head further comprises a first mirror for reflecting a laser beam emitted from at least one laser stimulating ray source, a condensing optical system for condensing the laser beam reflected by the first mirror onto the image carrier and condensing light released from the image carrier, and a second mirror for reflecting light released from the image carrier and condensed by the condensing optical system and leading it to the light detector, the axis of the laser beam condensed by the condensing optical system and the axis of the light released from the image carrier and condensed by the condensing optical system lying at a predetermined angle to each other.

According to this preferred aspect of the present invention, since the condensing optical system is used in common for condensing the laser beam emitted from at least one laser stimulating ray source onto the image carrier and condensing light released from the image carrier, the number of parts constituting the optical head can be reduced.

In a further preferred aspect of the present invention, an aperture is provided between the second mirror and the light detector so that the center thereof coincides with the center of the path of light released from the image carrier and only light released from the image carrier and to be detected by the light detector is allowed to pass therethrough.

According to this preferred aspect of the present invention, since the aperture is provided between the second mirror and the light detector so that the center thereof coincides with the center of the path of light released from the image carrier and only light released from the image carrier and to be detected by the light detector is allowed to pass therethrough, it is possible to cut the stimulating ray, thereby reducing noise in the image data and producing image data based on which an image having high resolution can be reproduced.

The above and other objects and features of the present invention will become apparent from the following description made with reference to the accompanying drawings.

DESCRIPTION OF THE PREFERRED EMBODIMENT

Figure 1:
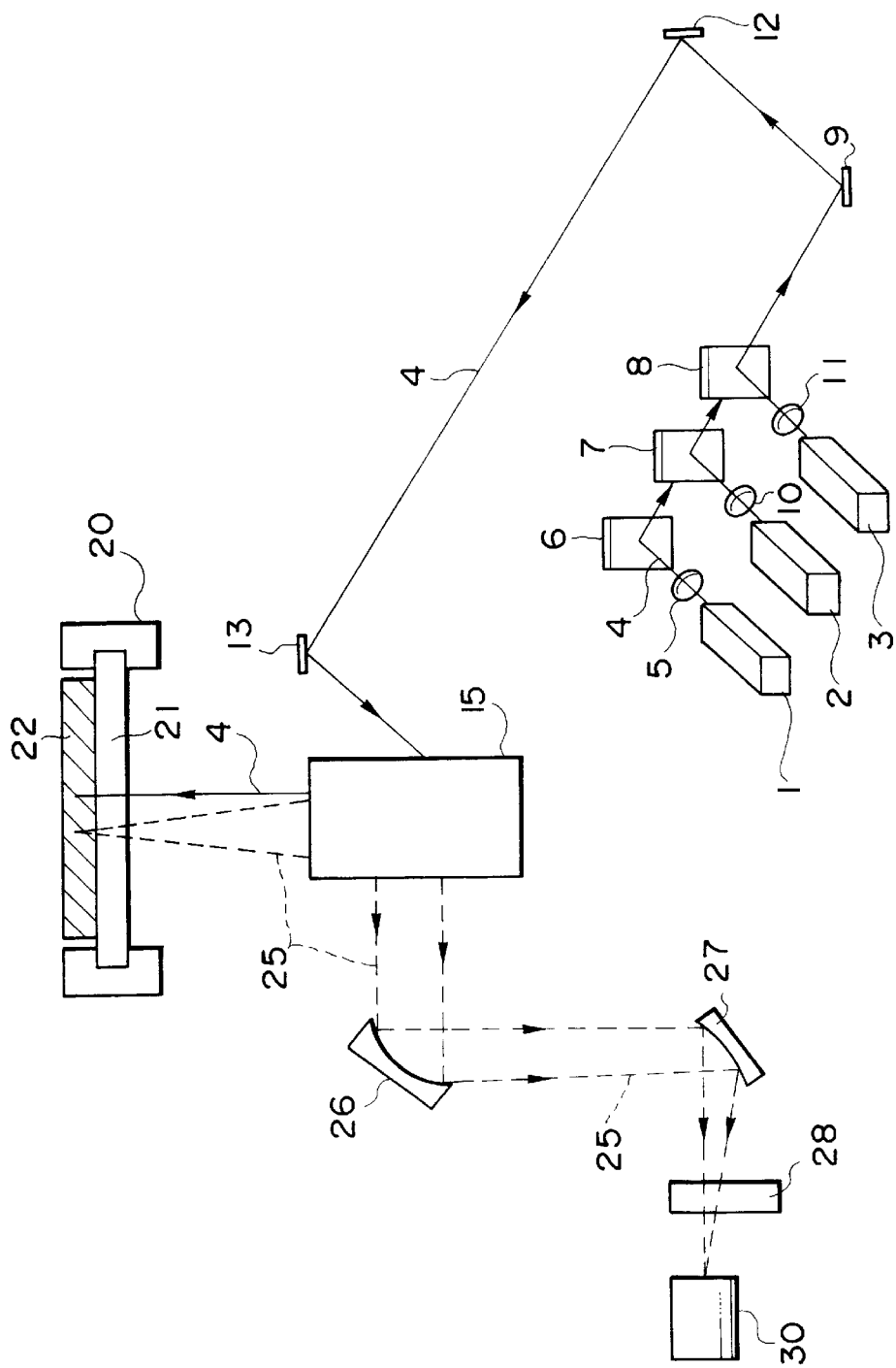
FIG. 1 is a schematic perspective view showing an image reading apparatus which is a preferred embodiment of the present invention.
Figure 2:
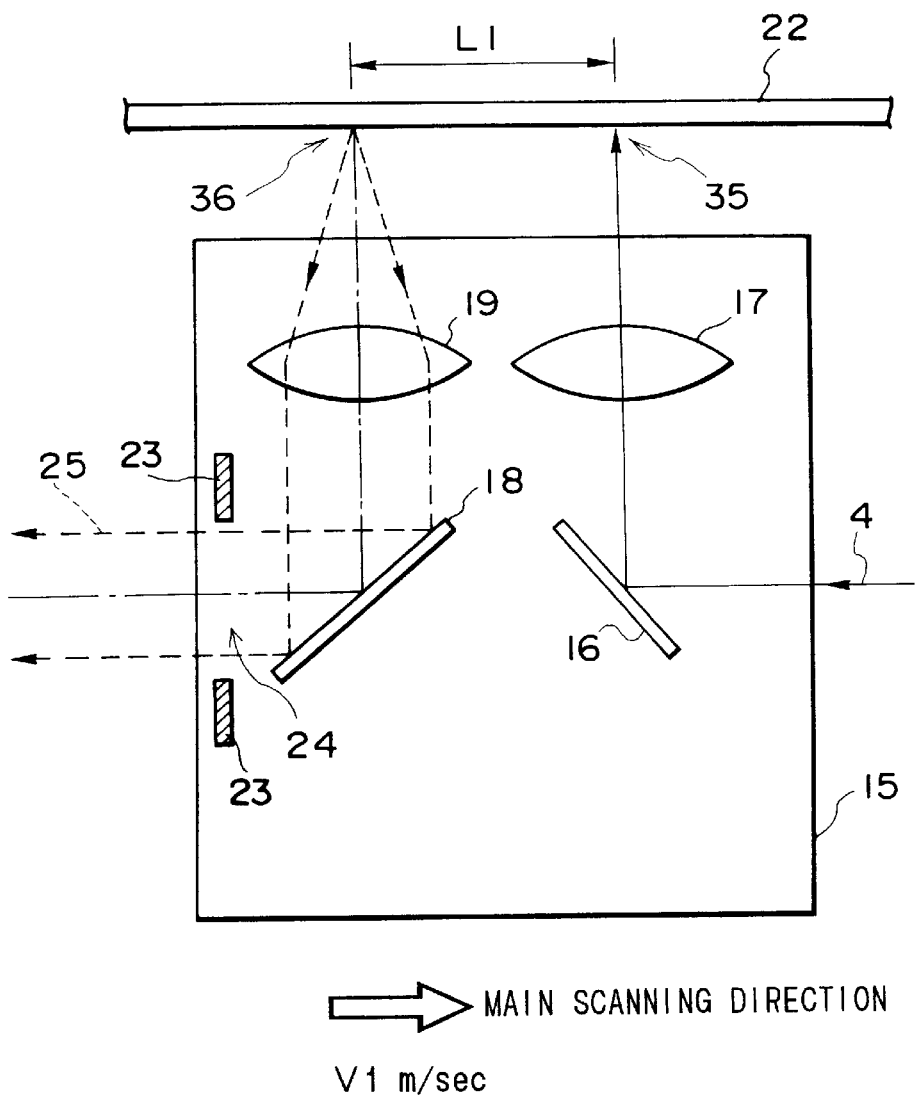
FIG. 2 is a schematic perspective view showing the internal structure of an optical head.
Figure 3:
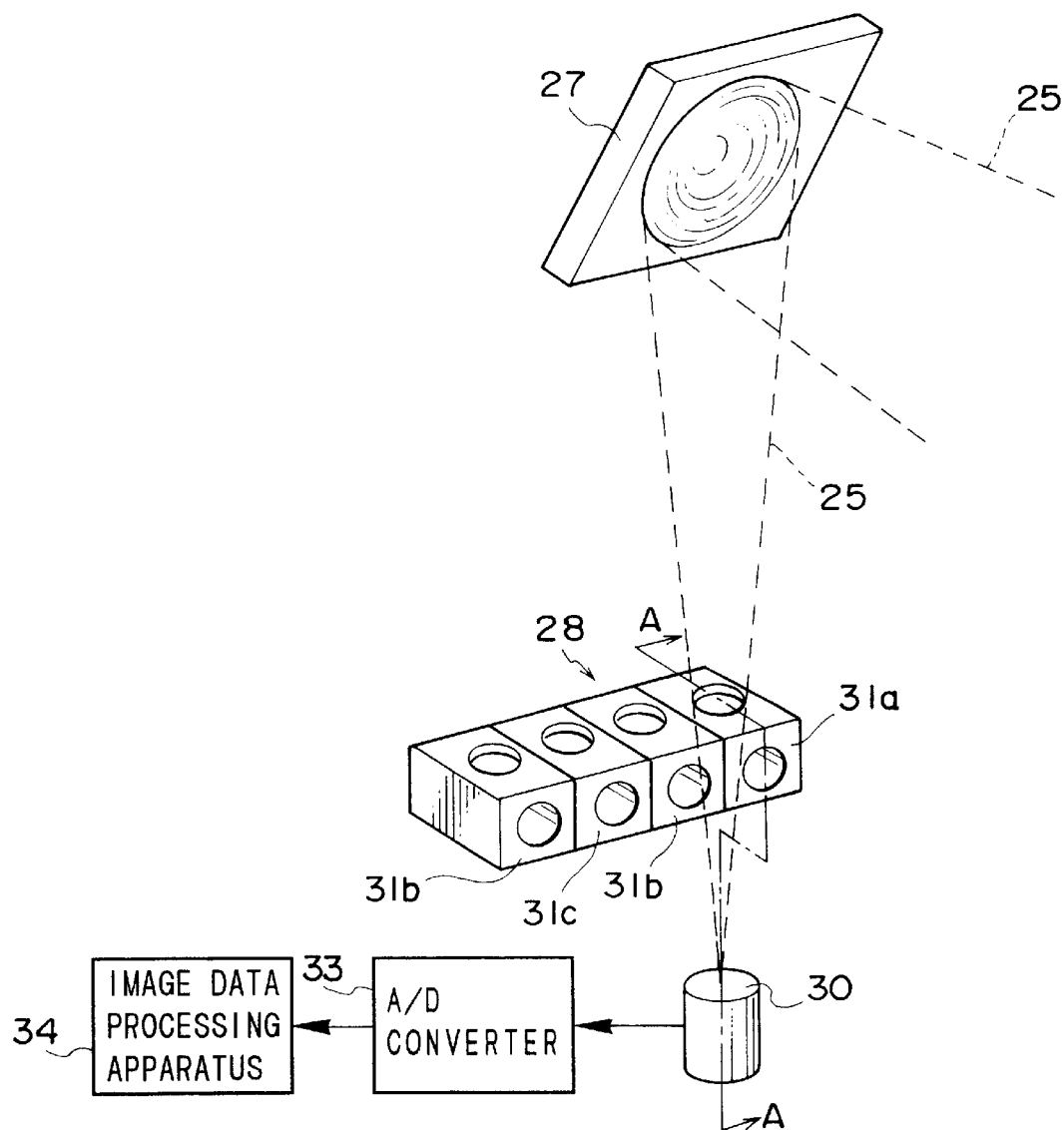
FIG. 3 is a schematic perspective view showing details in the vicinity of a photomultiplier.
Figure 4:
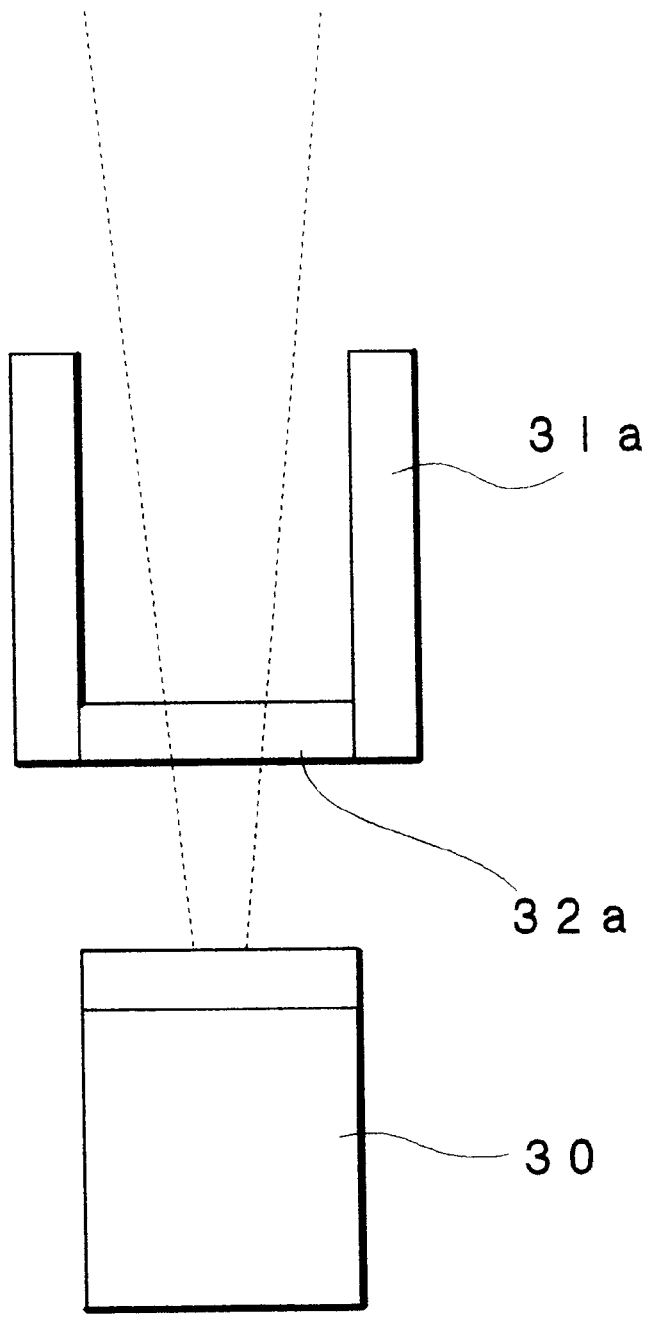
FIG. 4 is a schematic cross-sectional view taken along a line A—A in FIG. 3.

FIG. 1 is a schematic perspective view showing an image reading apparatus which is a preferred embodiment of the present invention and FIG. 2 is a schematic perspective view showing the internal structure of an optical head. FIG. 3 is a schematic perspective view showing the details in the vicinity of a photomultiplier and FIG. 4 is a schematic cross-sectional view taken along a line A—A in FIG. 3.

As shown in FIG. 1, an image reading apparatus includes a first laser stimulating ray source 1 for emitting a laser beam having a wavelength of 640 nm, a second laser stimulating ray source 2 for emitting a laser beam having a wavelength of 532 nm and a third laser stimulating ray source 3 for emitting a laser beam having a wavelength of 473 nm. In this embodiment, the first laser stimulating ray source 1 is constituted by a semiconductor laser beam source and the second laser stimulating ray source 2 and the third laser stimulating ray source 3 are constituted by a second harmonic generation element.

A laser beam 4 emitted from the first laser stimulating source 1 passes through a collimator lens 5, thereby being made a parallel beam and is reflected by a mirror 6. A first dichroic mirror 7 for transmitting light having a wavelength of 640 nm but reflecting light having a wavelength of 532 nm and a second dichroic mirror 8 for transmitting light having a wavelength equal to and longer than 532 nm but reflecting light having a wavelength of 473 nm are provided in an optical path of the laser beam 4 reflected by the mirror 6. The laser beam 4 emitted from the first laser stimulating ray source 1 passes through the first dichroic mirror 7 and the second dichroic mirror 8 and enters a mirror 9.

On the other hand, the laser beam 4 emitted from the second laser stimulating ray source 2 passes through a collimator lens 10, thereby being made a parallel beam and is reflected by the first dichroic mirror 7, thereby changing its direction by 90 degrees. The laser beam 4 then passes through the second dichroic mirror 8 and enters the mirror 9.

Further, the laser beam 4 emitted from the third laser stimulating ray source 3 passes through a collimator lens 11, thereby being made a parallel beam and is reflected by the second dichroic mirror 8, thereby changing its direction by 90 degrees. The laser beam 4 then enters the mirror 9.

The laser beam 4 entering the mirror 9 is reflected by the mirror 9 and enters a mirror 12. The laser beam 4 is reflected by the mirror 12 and further reflected by a mirror 13 to enter an optical head 15.

As shown in FIG. 2, the optical head 15 includes a mirror 16 and a mirror 18 spaced apart from each other in a main scanning direction, a convex lens 17 and a convex lens 19 spaced apart from each other in the main scanning direction and disposed in association with the mirror 16 and the mirror 18, and an aperture member 23. The aperture member 23 is provided with an aperture 24. The distance between the convex lens 17 and the convex lens 19 in the main scanning direction is L1.

The optical head 15 is constituted so as to be moved in the main scanning direction and a sub-scanning direction by a scanning mechanism described later.

The optical head is exchangeable and the image reading apparatus according to this embodiment is constituted so that when the appropriate optical head 15 is mounted, it can selectively read an electrophoresis image of a a protein molecule labeled with a fluorescent dye and recorded in a gel support, a transfer support or the like, or an autoradiographic image of locational information regarding a radioactively labeling substance recorded in a stimulable phosphor layer formed on a stimulable phosphor sheet.

A laser beam 4 entering the optical head 15 is reflected by the mirror 16 and condensed by the convex lens 17 onto the surface of an image carrier 22 placed on a glass plate 21 of a stage 20.

In FIGS. 1 and 2, the image carrier 22 is constituted by a gel support containing a fluorescent dye and in this embodiment, the image carrier 22 carries an electrophoresis image of a protein molecule labeled with a fluorescent dye.

The electrophoresis image of a a protein molecule labeled with a fluorescent dye is recorded in a gel support by dying and labeling protein electrophoresed on the gel support with, for example, SYPRO Ruby (registered trademark).

When the laser beam 4 is impinged on the image carrier 22 recording the electrophoresis image of a protein molecule labeled with a fluorescent dye, the fluorescent dye contained in the gel support is stimulated by the laser beam 4 to release fluorescence.

When the laser beam 4 impinges on a stimulation point 35 in this manner, the fluorescent dye contained in the image carrier 22 is stimulated and fluorescence is released from the stimulation point 35. However, in this embodiment, the fluorescence released from the stimulation point 35 is not led to a photomultiplier 30 described later. Instead, when the optical head 15 has been moved in the main scanning direction by a scanning mechanism described later until the stimulation point 35 reaches a detection point 36 facing the convex lens 19, residual fluorescence released from the fluorescent dye positioned at the detection point 36 is led to the photomultiplier and photoelectrically detected thereby.

A fluorescent dye such as SYPRO Ruby (registered trademark) has a property of releasing fluorescence when stimulated by the laser beam 4 and successively releasing fluorescence called residual fluorescence even after it is no longer being irradiated by the laser beam 4. The image reading apparatus according to this embodiment is constituted so as to photoelectrically detect such residual fluorescence and read a fluorescent image carried by the image carrier 22.

The residual fluorescence 25 released from the detection point 36 of the image carrier 22 passes through the convex lens 19, thereby being made a parallel beam and is reflected by the mirror 18. The residual fluorescence 25 reflected by the mirror 18 advances to a concave mirror 26 and is condensed onto a concave mirror 27.

As shown in FIG. 3, residual fluorescence 25 condensed onto the concave mirror 27 is reflected downward by the concave mirror 27 and enters a filter unit 27, thereby cutting light of a predetermined wavelength region. The residual fluorescence 25 then enters the photomultiplier 30 and is photoelectrically detected thereby.

As shown in FIG. 3, the filter unit 28 is provided with four filter members 31a, 31b, 31c and 31d and is constituted to be laterally movable in FIG. 3 by a motor (not shown).

FIG. 4 is a schematic cross-sectional view taken along a line A—A in FIG. 3.

As shown in FIG. 4, the filter member 31a includes a filter 32a and the filter 32a is used for reading fluorescence released from a fluorescent dye contained in the image carrier 22 upon being stimulated using the first laser stimulating ray source 1 and has a property of cutting off light having a wavelength of 640 nm but transmitting light having a wavelength longer than 640 nm.

Figure 5:
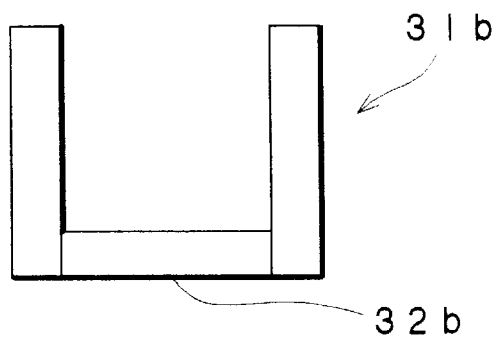
FIG. 5 is a schematic cross-sectional view taken along a line B—B in FIG. 3.

FIG. 5 is a schematic cross-sectional view taken along a line B—B in FIG. 3.

As shown in FIG. 5, the filter member 31b includes a filter 32b and the filter 32b is used for reading fluorescence released from a fluorescent dye contained in the image carrier 22 upon being stimulated using the second laser stimulating ray source 2 and has a property of cutting off light having a wavelength of 532 nm but transmitting light having a wavelength longer than 532 nm.

Figure 6:
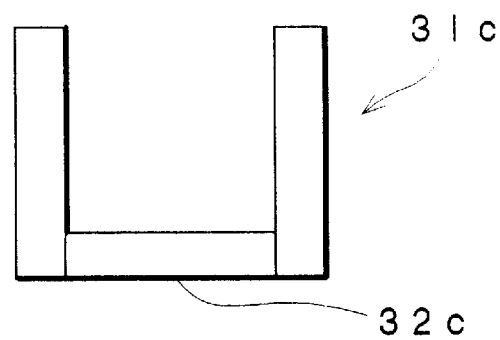
FIG. 6 is a schematic cross-sectional view taken along a line C—C in FIG. 3.

FIG. 6 is a schematic cross-sectional view taken along a line C—C in FIG. 3.

As shown in FIG. 6, the filter member 31c includes a filter 32c and the filter 32c is used for reading fluorescence released from a fluorescent dye contained in the image carrier 22 upon being stimulated using the third laser stimulating ray source 3 and has a property of cutting off light having a wavelength of 473 nm but transmitting light having a wavelength longer than 473 nm.

Figure 7:
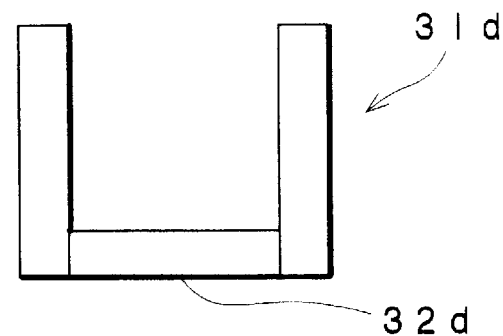
FIG. 7 is a schematic cross-sectional view taken along a line D—D in FIG. 3.

FIG. 7 is a schematic cross-sectional view taken along a line D—D in FIG. 3. As shown in FIG. 7, the filter member 31d includes a filter 32d and the filter 32d is used in the case where the image carrier 21 is a stimulable phosphor sheet for reading stimulated emission released from stimulable phosphor contained in the stimulable phosphor sheet upon being stimulated using the first laser stimulating ray source 1 and has a property of transmitting only light having a wavelength corresponding to that of stimulated emission emitted from stimulable phosphor but cutting off light having a wavelength of 640 nm.

Therefore, in accordance with the kind of a stimulating ray source to be used, namely, depending upon whether the kind of the image carrier 22 and the kind of fluorescent substance, one of these filter members 31a, 31b, 31c, 31d is selectively positioned in front of the photomultiplier 30, thereby enabling the photomultiplier 30 to photoelectrically detect only light to be detected.

The analog data produced by photoelectrically detecting light by the photomultiplier 33 are converted by an A/D converter 33 into digital data and the digital data are fed to an image data processing apparatus 34.

Figure 8:
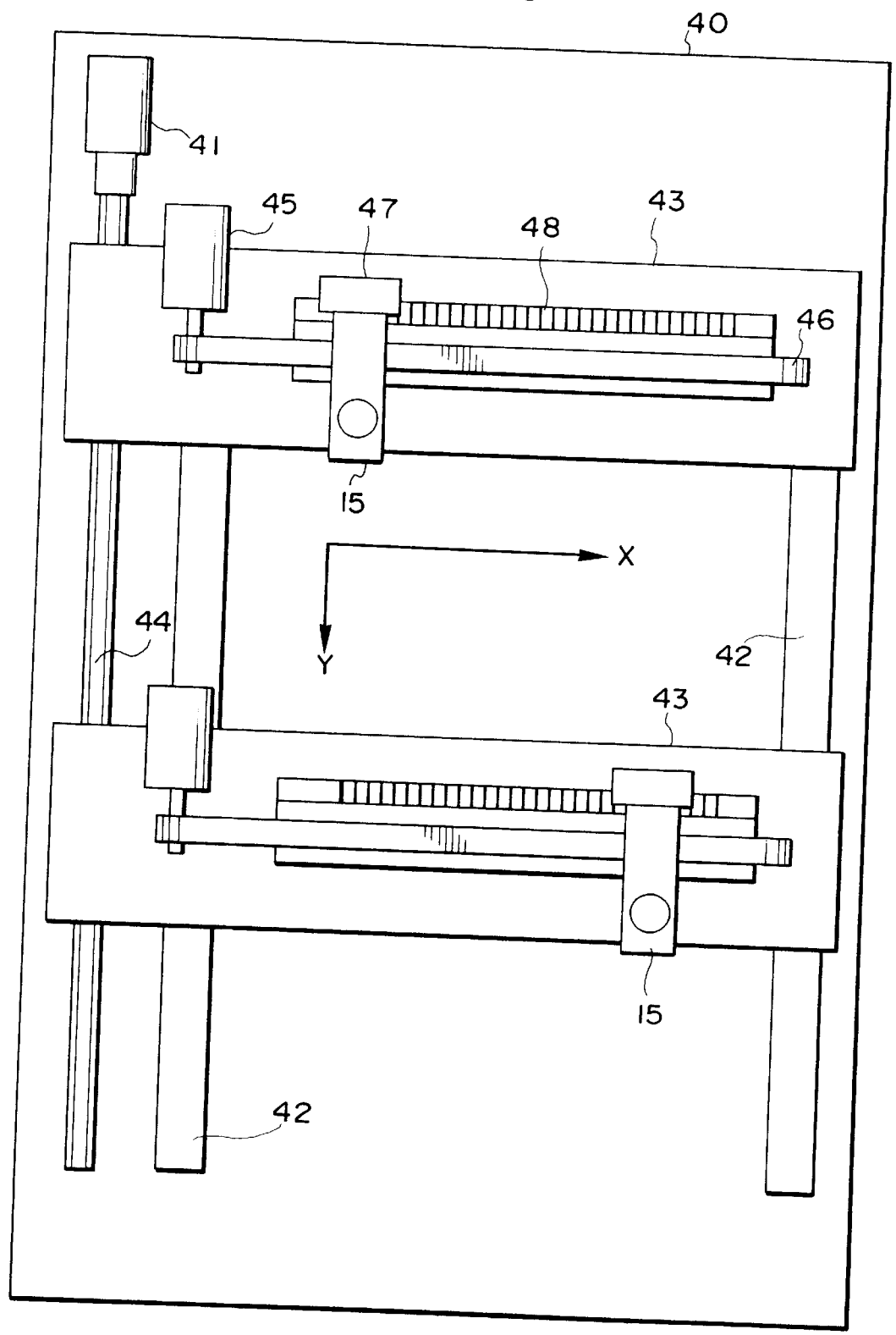
FIG. 8 is a schematic plan view of a scanning mechanism of an optical head.

FIG. 8 is a schematic plan view showing the scanning mechanism of the optical head 15. In FIG. 8, optical systems except the optical head 15 and paths of the laser beam 4 and fluorescence 25 or stimulated emission 25 are omitted for simplification.

As shown in FIG. 8, the scanning mechanism of the optical head 15 includes a base plate 40, and sub-scanning pulse motor 41 and a pair of rails 42, 42 are fixed on the base plate 40. A movable base plate 43 is provided so as to be movable in the sub-scanning direction indicated by an arrow Y in FIG. 8.

The movable base plate 43 is formed with a threaded hole (not shown) and a threaded rod 44 rotated by the sub-scanning pulse motor 41 is engaged with the inside of the hole.

A main scanning pulse motor 45 is provided on the movable base plate 43. The main scanning pulse motor 45 is adapted for driving an endless belt 46. The optical head 15 is fixed to the endless belt 46 and when the endless belt 46 is driven by the main scanning pulse motor 45, the optical head 15 is moved in the main scanning direction indicated by an arrow X in FIG. 8. In FIG. 8, the reference numeral 47 designates a linear encoder for detecting the position of the optical head 15 in the main scanning direction and the reference numeral 48 designates slits of the linear encoder 47.

Therefore, the optical head 15 is moved in the X direction and Y direction in FIG. 8 by driving the endless belt 46 in the main scanning direction by the main scanning pulse motor 45 and moving the movable base plate 43 in the sub-scanning direction by the sub-scanning pulse motor 41, thereby scanning the whole surface of the image carrier 22 with the laser beam 4.

The optical head 15 can be removed from the base plate 43 and exchanged. The optical head 15 shown in FIG. 2 is used for reading a fluorescent image of a protein labeled with a fluorescent substance and recorded in a gel support or a transfer support, and when an autoradiographic image recorded in a stimulable phosphor layer formed on a stimulable phosphor sheet is read, the optical head 15 shown in FIG. 2 is removed and another optical head is mounted on the base plate 43.

The main scanning pulse motor 45 provided on the movable base plate 43 drives the endless belt 46 in the main scanning direction and the optical head 15 is driven in the main scanning direction at a speed V1 meter/second in synchronism with the movement of the endless belt 46.

The position of the optical head 15 in the main scanning direction is monitored by counting the number of slits 48 using the linear encoder 47 mounted on the optical head 15.

On the other hand, the sub-scanning pulse motor 41 provided on the base plate 40 rotates the rod 44 to move the base plate 43 along the pair of rails 42, 42 in the sub-scanning direction in synchronism with the rotation of the rod 44.

Figure 9:
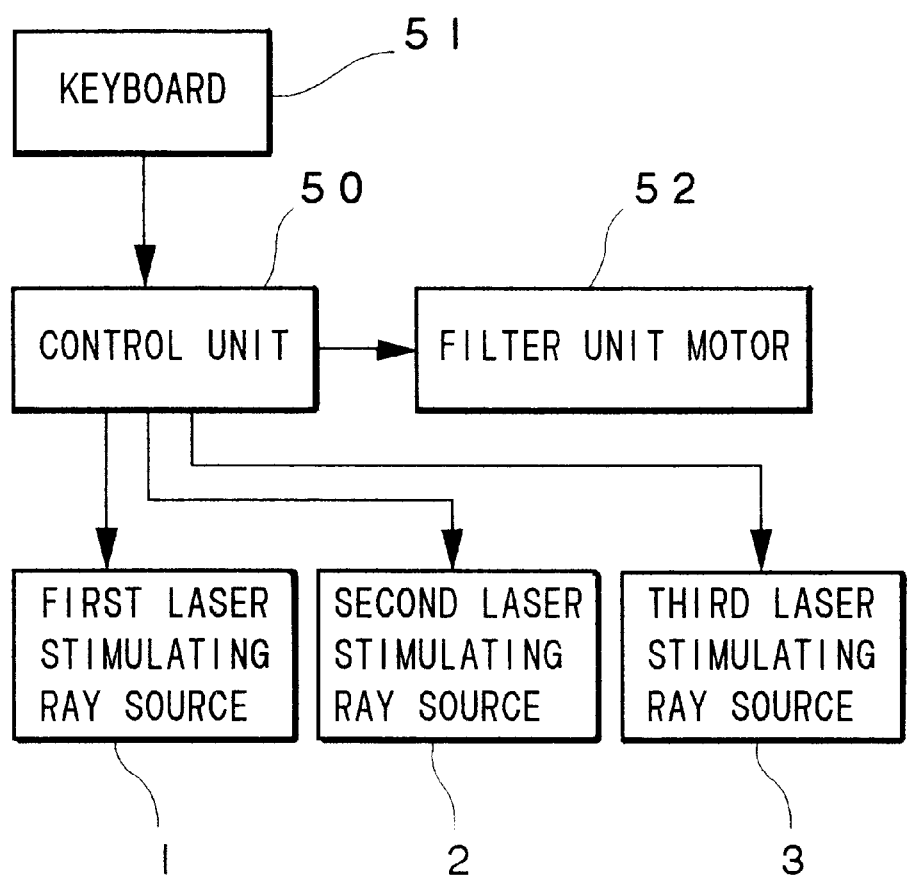
FIG. 9 is a block diagram of a control system, an input system and a drive system of an image reading apparatus which is a preferred embodiment of the present invention.

FIG. 9 is a block diagram of a control system, an input system and a drive system of the image reading apparatus which is a preferred embodiment of the present invention.

As shown in FIG. 9, the control system of the image reading apparatus includes a control unit 50 and the input system of the image reading apparatus includes a keyboard 51 which can be operated by an operator and through which various instruction signals can be input.

As shown in FIG. 9, the drive system of the image reading apparatus includes a filter unit motor 52 for moving the filter unit 28 provided with the four filter members 31a, 31b, 31c and 31d.

The control unit 50 is adapted for selectively outputting a drive signal to the first laser stimulating ray source 1, the second laser stimulating ray source 2 or the third laser stimulating ray source 3 and outputting a drive signal to the filter unit motor 52.

The thus constituted image reading apparatus according to this embodiment reads a fluorescent image of a specimen labeled with a fluorescent substance and carried in a gel support or a transfer support, for example, an electrophoresis image of a protein molecule labeled with SYPRO Ruby (registered trademark) and carried in a gel support, and produces digital image data in the following manner.

A gel support is first set on the glass plate 21 of the stage 20 as an image carrier 22.

The kind of fluorescent substance labeling the specimen is then input through the keyboard 51 by the operator. In this embodiment, SYPRO Ruby (registered trademark) and an instruction signal indicating that a fluorescent image is to be read are input through the keyboard 51.

The instruction signal and the kind of a fluorescent substance labeling the specimen input through the keyboard 51 are input to the control unit 50 and when the control unit 50 receives the instruction signal, it determines the laser stimulating ray source to be used in accordance with a table stored in a memory (not shown) and also determines what filter is to be positioned in the path of fluorescence 25 among the filters 32a, 32b, 32c and 32d.

When the specimen is labeled with SYPRO Ruby (registered trademark), which can be efficiently stimulated by a laser beam having a wavelength of 473 nm, the control unit 50 selects the third laser stimulating ray source 3 and the filter 32c and outputs a drive signal to the filter unit motor 52, thereby moving the filter unit 28 so that the filter member 31c including the filter 32c having a property of cutting off light having a wavelength of 473 nm but transmitting light having a wavelength longer than 473 nm in the path of the fluorescence 25.

The control unit 50 then outputs a drive signal to the third laser stimulating ray source 3 and activates it, thereby causing it to emit a laser beam 4 having a wavelength of 473 nm.

The laser beam 4 emitted from the third laser stimulating ray source 3 is made a parallel beam by the collimator lens 11 and advances to the second dichroic mirror 8 to be reflected thereby.

The laser beam 4 reflected by the second dichroic mirror 8 advances to the mirror 9.

The laser beam 4 is then reflected by the mirror 9 and enters the mirror 12 to be reflected thereby. The laser beam 4 is reflected by the mirror 12 is further reflected by the mirror 13 and enters the optical head 15.

As shown in FIG. 2, the laser beam 4 entering the optical head 15 is led via the mirror 16 and the convex lens 17 to the stimulation point 35 of the image carrier 22.

When the laser beam 4 impinges at the stimulation point 35 of the image carrier 22, the fluorescent substance positioned at the stimulation point 35 of the image carrier 22, SYPRO Ruby (registered trademark) in this embodiment, is stimulated, thereby releasing fluorescence. However, in this embodiment, as shown in FIG. 2, the fluorescence released from the fluorescent substance positioned at the stimulation point 35 in response to the irradiation by the laser beam 4 is not led to the photomultiplier 30. Instead, when the optical head 15 has been moved by the main scanning pulse motor 45 in the main scanning direction by a distance L1 equal to the distance between the center of the convex lens 17 and the center of the convex lens 19 and the stimulation point 35 has reached a detection point 36, residual fluorescence 25 released from the fluorescent dye positioned at the detection point 36 is received by the optical head 15 and condensed by the convex lens 19.

Therefore, since the optical head 15 is moved by the main scanning pulse motor 45 at a speed of V/1 meter/second in the main scanning direction, residual fluorescence 25 condensed by the convex lens 19 is fluorescence released from the fluorescent dye that was positioned at the stimulation point 35 of the image carrier 22 and irradiated by the laser beam 4 1/V1 second earlier.

Figure 10:
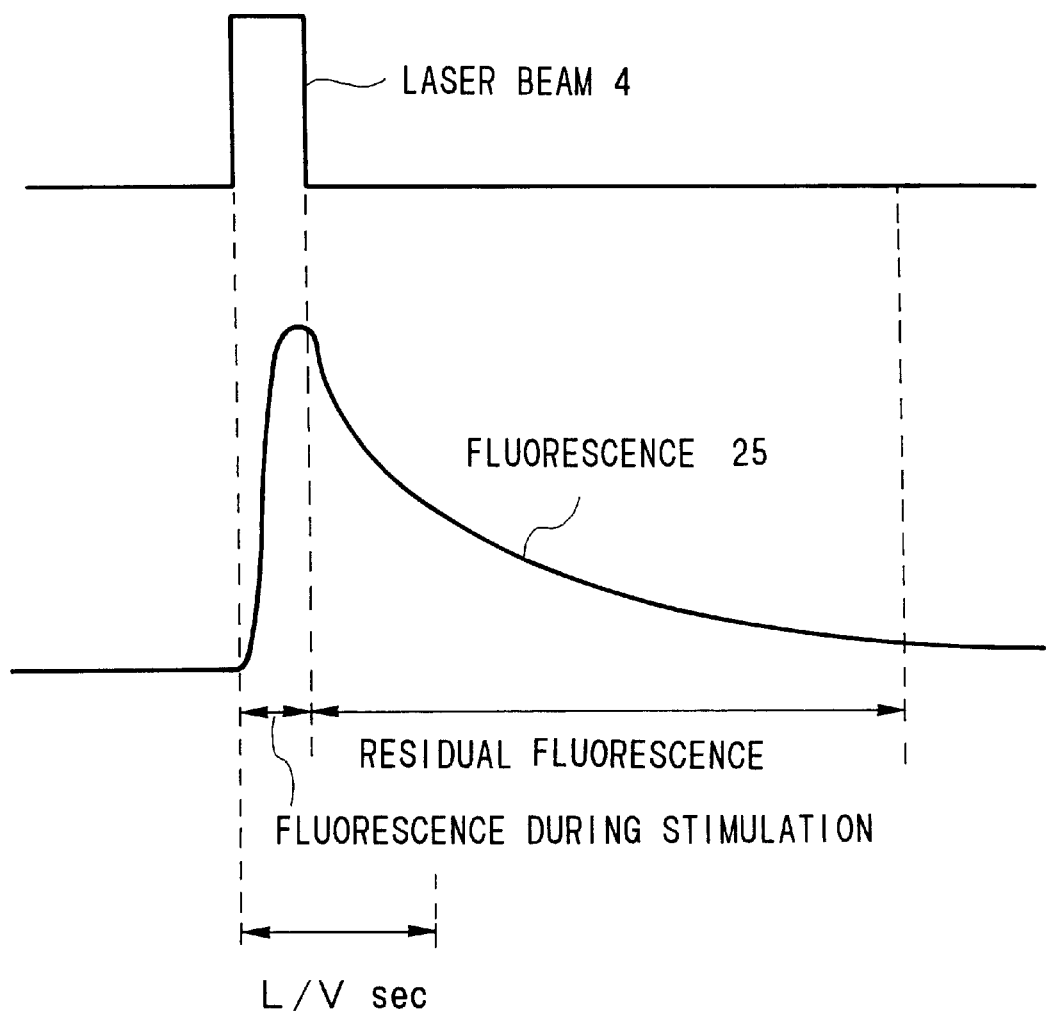
FIG. 10 is a graph showing the relationship between the time of stimulation with a laser beam and the intensity of fluorescence released from a fluorescent substance.

FIG. 10 is a graph showing the relationship between the time of stimulation with the laser beam 4 and the intensity of fluorescence released from a fluorescent substance such as SYPRO Ruby.

As shown in FIG. 10, when the fluorescent dye contained in the image carrier 22 is irradiated by the laser beam 4, the fluorescent dye immediately releases fluorescence. The intensity of the fluorescence becomes maximum during the irradiation by the laser beam 4 and even after the optical head 15 has been moved in the main scanning direction and the fluorescent dye is no longer irradiated by the laser beam 4, release of fluorescence from the fluorescent dye does not stop but gradually decreases in intensity. In this specification, fluorescence released from a fluorescent substance during the irradiation by a laser beam is called "fluorescence during stimulation" and fluorescence released from a fluorescent substance after completion of irradiation by a laser beam is called "residual fluorescence."

As apparent from FIG. 10, a fluorescent substance releases residual fluorescence after irradiation by a laser beam is discontinued. The effect of the laser beam 4 used as the stimulating ray can therefore be eliminated by detecting only residual fluorescence released from the fluorescent dye. Reliable detection is therefore possible.

More specifically, as apparent from FIG. 10, if the distance L1 in the main scanning direction between the center of the convex lens 17 and the center of the convex lens 19 and the main scanning speed V1 are selected so that L1/V1 equals the time period L/V during which the fluorescent dye releases residual fluorescence of greater than a prescribed intensity after discontinuation of irradiation by the laser beam 4, residual fluorescence 25 can be detected.

The residual fluorescence 25 released from the fluorescent dye positioned at the detection point 36 when the stimulation point 35 reaches the detection point 36 is made a parallel beam by the convex lens 19 and reflected by the mirror 18. The residual fluorescence 25 further passes through the aperture 23 formed in the aperture member 23 and enters the concave mirror 26, thereby being condensed onto the concave mirror 27.

The aperture 24 is formed so as to allow only residual fluorescence 25 released from a fluorescent dye positioned at the detection point 36 and reflected by the mirror 18 to pass therethrough and the center thereof coincides with the center of the path of residual fluorescence 25.

As shown in FIG. 3, the residual fluorescence 25 condensed onto the concave mirror 27 is reflected downward by the concave mirror 27 and enters the filter 32c of the filter unit 28.

Since the filter 32c has a property of cutting off light having a wavelength of 473 nm but transmitting light having a wavelength longer than 473 nm, the stimulating ray having a wavelength of 473 nm is cut off by the filter 32c and only light in the wavelength of the residual fluorescence 25 released from the fluorescent substance contained in the gel support and labeling the specimen, for example, SYPRO Ruby (registered trademark), passes through the filter 32c to be photoelectrically detected by the photomultiplier 30.

As described above, since the optical head 15 is moved on the base plate 42 in the X direction in FIG. 8 by the main scanning pulse motor 45 mounted on the base plate 42 and the base plate 42 is moved in the Y direction in FIG. 8 by the sub-scanning pulse motor 41, the whole surface of the gel support is scanned by the laser beam 4. Therefore, the photomultiplier 30 can read the a fluorescent image recorded in the gel support by photoelectrically detecting the residual fluorescence 25 released from the fluorescent dye, for example, SYPRO Ruby, contained in the gel support and labeling the specimen, and analog image data can be produced.

The analog image data produced when the photomultiplier 30 photoelectrically detects the residual fluorescence 25 are converted by the A/D converter 33 into digital image data and the digital data are fed to the image data processing apparatus 34.

On the other hand, when an autoradiographic image regarding locational information of a radioactively labeling substance in a gene obtained using a Southern blot-hybridization method and recorded in a stimulable phosphor layer formed on a stimulable phosphor sheet is to be read, the optical head 15 is removed and another optical head is mounted.

Figure 11:
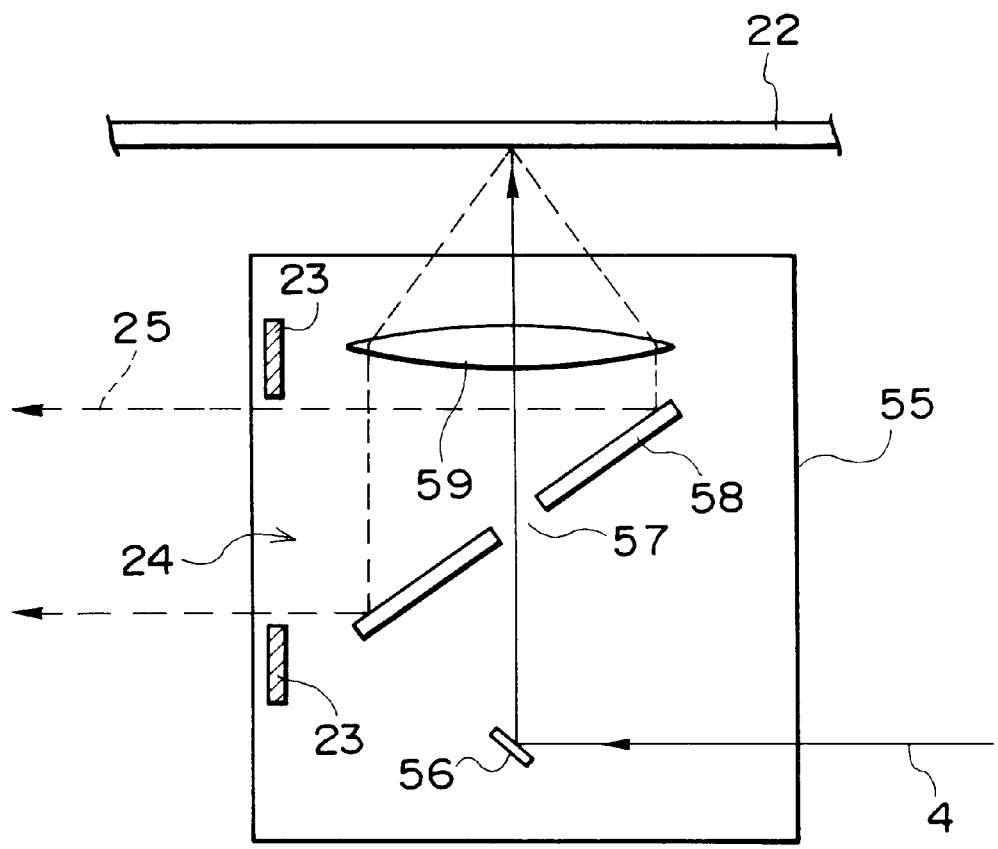
FIG. 11 is a schematic longitudinal cross-sectional view showing an optical head used for reading an autoradiographic image.

FIG. 11 is a schematic longitudinal cross-sectional view of an optical head used for reading an autoradiographic image.

As shown in FIG. 11, an optical head 55 is provided with a mirror 56, a perforated mirror 58 whose center portion is formed with a hole 57, a convex lens 59 and an aperture member 23. The aperture member 23 is formed with an aperture 24.

The image reading apparatus according to this embodiment reads an autoradiographic image regarding locational information of a radioactively labeling substance and recorded in a stimulable phosphor layer formed on a stimulable phosphor sheet and produces digital image data in the following manner.

Locational information regarding a radioactively labeling substance is recorded in a stimulable phosphor layer formed on the stimulable sheet in following manner. Here, Locational information as termed here includes a variety of information relating to the location of radioactive labeled substances, or aggregations thereof, present in a specimen, such as the location, the shape, the concentration, the distribution or combinations thereof.

When locational information regarding a radioactively labeling substance for example, in a gene obtained using a Southern blot-hybridization method is to be recorded in the stimulable phosphor layer formed on the stimulable sheet, first, a plurality of DNA fragments containing a specific gene are separated and distributed on a gel support medium by means of electrophoresis and are denatured by alkali processing to form single-stranded DNA.

Then, according to the known Southern blotting method, the gel support and a transfer support such as a nitrocellulose filter are placed in layers to transfer at least a part of the denatured DNA fragments onto the transfer support and the transferred DNA fragments are fixed on the transfer support by heating and irradiating with an ultraviolet ray.

Further, probes prepared by radioactively labeling DNA or RNA which is complementary to the DNA containing the specific gene and the denatured DNA fragments are hybridized by heating to form double-stranded DNA fragments or combined DNA and RNA. Since the denatured DNA fragments are fixed on the transfer support at this time, only the DNA fragments which are complimentary to the probe DNA or probe RNA are hybridized to acquire the radioactively labeled probe.

Then, the probes which have not formed hybrids are removed by washing with a proper solution and only the DNA fragments having a specific gene form hybrids with the radioactively labeled DNA or RNA on the transfer support to be radioactively labeled. The thus obtained transfer support is dried and the transfer support and the stimulable phosphor sheet are stacked for a certain period of time to expose the stimulable phosphor layer and at least a part of the radiation emitted from the radioactively labeling substance on the transfer support is absorbed in the stimulable phosphor layer formed on the stimulable phosphor sheet, whereby the locational information regarding the radioactively labeled substance in the specimen is stored in the form of an image in the stimulable phosphor layer.

The stimulable phosphor sheet is first set on a glass plate 21 of a stage 20 as an image carrier 22.

An instruction signal indicating that an autoradiographic image regarding locational information of a radioactively labeling substance and recorded in a stimulable phosphor layer formed on a stimulable phosphor sheet is to be read is input through the keyboard 51 by the operator.

The instruction signal input through the keyboard 51 is input to the control unit 50. In accordance with the instruction signal, the control unit 50 outputs a drive signal to the filter unit motor 52, thereby causing it to move the filter unit 28 so as to position the filter member 31d including the filter 32d having a property to transmit only light having a wavelength corresponding to that of stimulated emission emitted from stimulable phosphor but cut off light having a wavelength of 640 nm in the path of stimulated emission 25.

The control unit 50 then outputs a drive signal to the first stimulating ray source 1 and activates the first stimulating ray source 1, thereby causing it to emit a laser beam 4 having a wavelength of 640 nm.

The laser beam 4 emitted from the first stimulating ray source 1 is made a parallel beam by the collimator lens 5 and enters the mirror 6 to be reflected thereby.

The laser beam 4 reflected by the mirror 6 passes through the first dichroic mirror 7 and the second dichroic mirror 8 and enters the mirror 9.

The laser beam 4 entering the mirror 9 is reflected by the mirror 9 and further enters the mirror 12 to be reflected thereby. The laser beam 4 reflected by the mirror 12 is further reflected by the mirror 13 and enters the optical head 55.

The laser beam 4 entering the optical head 55 is reflected by the mirror 56, passes through the hole 57 formed in the perforated mirror 58 and condensed by the convex lens 59 onto the stimulable phosphor layer formed on the stimulable phosphor sheet placed on the glass plate 21 of the stage 20.

As a result, a stimulable phosphor contained in the stimulable phosphor layer formed on the stimulable phosphor sheet is stimulated by the laser beam 4 and stimulated emission 25 is released from the stimulable phosphor.

The stimulated emission 25 released from the stimulable phosphor is made a parallel beam and enters the perforated mirror 58.

The stimulated emission 25 is reflected by the perforated mirror 58 and passes through the aperture 24 formed in the aperture member 23. The stimulated emission 25 further enters the concave mirror 26 and condensed onto the concave mirror 27. The aperture 24 is formed so as to allow only stimulated emission 25 released from the stimulable phosphor and reflected by the perforated mirror 58 and the center thereof coincides with the center of the path of stimulated emission 25.

As shown in FIG. 3, the stimulated emission 25 condensed onto the concave mirror 27 is reflected downwardly and enters the filter 32d of the filter unit 28.

Since the filter 32d has a property to transmit only light having a wavelength corresponding to that of stimulated emission emitted from stimulable phosphor but cut off light having a wavelength of 640 nm, the stimulating ray having a wavelength of 640 nm is cut and only light in the wavelength of the stimulated emission passes through the filter 32d and photoelectrically detected by the photomultiplier 30.

As described above, since the optical head 15 is moved on the base plate 42 in the X direction in FIG. 8 by the main scanning pulse motor 45 mounted on the base plate 42 and the base plate 42 is moved in the Y direction in FIG. 8 by the sub-scanning pulse motor 41, the whole surface of the stimulable phosphor layer formed on the stimulable phosphor sheet is scanned by the laser beam 4. Therefore, an autoradiographic image regarding locational information of a radioactively labeling substance can be read by photoelectrically detecting the stimulated emission 25 released from a stimulable phosphor contained in the stimulable phosphor layer by the photomultiplier 30 and analog image data can be produced.

The analog image data produced by photoelectrically detecting the residual fluorescence 25 by the photomultiplier 30 are converted by the A/D converter 33 into digital image data and the digital data are fed to the image data processing apparatus 34.

According to the above described embodiment, in the case of reading a fluorescent image of a specimen labeled with a fluorescent substance and recorded in a gel support or a transfer support, for example, an electrophoresis image of a protein molecule labeled with SYPRO Ruby (registered trademark) and recorded in a gel support, it is possible to prevent the laser beam 4 from generating noise in the image data and improve the S/N ratio because residual fluorescence 25 released from the fluorescent dye which is no longer being irradiated by the laser beam 4 is detected.

Further, according to the above described embodiment, a fluorescent image is read by leading residual fluorescence 25 released from the fluorescent dye when the optical head 15 has been moved by the distance L1 in the main scanning direction by the main scanning pulse motor 45 after the fluorescent dye was irradiated by the laser beam 4 to the photomultiplier 30 via the convex lens 19, the mirror 18, the concave mirror 26 and the concave mirror 27 and photoelectrically detecting the residual fluorescence 25. Therefore, since it is not required to turn the laser stimulating ray source for detecting the residual fluorescence 25 on and off, a fluorescent image can be read at a high speed.

Furthermore, according to the above described embodiment, since the optical head 15 and the optical head 55 are exchangeable, the image reading apparatus can be used in common for an autoradiographic image detecting system, a chemiluminescent image detecting system, an electron microscopic image detecting system and a radiographic diffraction image detecting system using a stimulable phosphor sheet, and the fluorescent image detecting system, which systems are used for similar purposes.

Moreover, according to the above described embodiment, the optical head 15 and the optical head 55 are provided with the apertures 24 which are formed so as to allow only residual fluorescence 25 released from a fluorescent dye positioned at the detection point 36 and reflected by the mirror 18 and stimulated emission 25 released from a stimulable phosphor and reflected by the perforated mirror 58 and whose centers coincide with the center of the path of the residual fluorescence 25 and the stimulated emission 25.

Therefore, it is possible to cut the stimulating ray, thereby reducing noise in the image data and producing image data based on which an image having high resolution can be reproduced.

Figure 12:
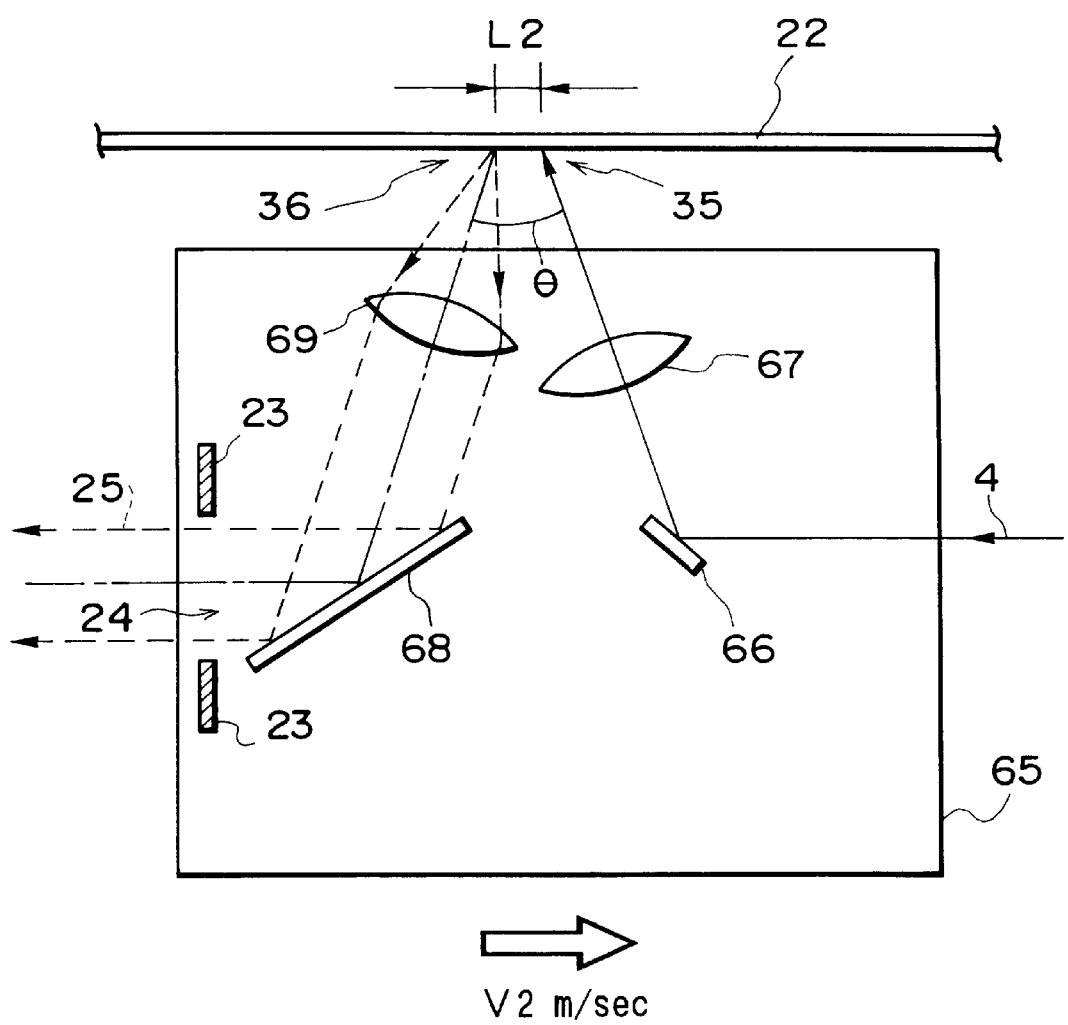
FIG. 12 is a schematic longitudinal cross-sectional view showing the internal structure of an optical head used in an image reading apparatus which is another preferred embodiment of the present invention.

FIG. 12 is a schematic longitudinal cross-sectional view showing the internal structure of an optical head used for an image reading apparatus which is another preferred embodiment of the present invention.

The image reading apparatus according to this embodiment has the same structure as that of the image reading apparatus according to the embodiment shown in FIGS. 1 to 11 except that an optical head 65 is employed instead of the optical head 15.

As shown in FIG. 12, the optical head 65 used in the image reading apparatus according to this embodiment is provided with a mirror 66, a mirror 68, a convex lens 67, a convex lens 69 and an aperture member 23. The aperture member 23 is formed with an aperture 24.

In this embodiment, the optical axes of the convex lens 67 and the convex lens 69 are not parallel to each other but lie at a predetermined angle θ to each other. The laser beam 4 is condensed by the convex lens 67 onto the stimulation point 35 on the image carrier 22 and fluorescence released from the fluorescent dye positioned at a detection point 36 spaced from the stimulation point 35 by a distance L2 is condensed by the convex lens 69 and led to downstream optical systems.

Similarly to the embodiment shown in FIGS. 1 to 11, in this embodiment, the optical head 65 is moved by the main scanning pulse motor 45 by the distance L2 in the main scanning direction after a fluorescent substance was irradiated by the laser beam 4 and residual fluorescence 25 released from the fluorescent substance when the stimulation point 35 of the image carrier 22 has been moved to the detection point 36 is condensed by the convex lens 69, led to the photomultiplier 30 via the mirror 68, the aperture 24, the convex mirror 26 and the convex mirror 27, and photoelectrically detected by the photomultiplier 30, thereby reading a fluorescent image, for example, an electrophoresis image of a protein molecule labeled with SYPRO Ruby (registered trademark) and carried in a gel support.

Similarly to the optical head 15 shown in FIG. 2, the optical head 65 is moved by the main scanning pulse motor 45 in the main scanning direction and the moving speed of the optical head 65 is determined to be V2 meter/second in this embodiment. Therefore, residual fluorescence 25 released from a fluorescent substance when L2/V2 second has passed after the fluorescent dye was irradiated by the laser beam 4 is condensed by the convex lens 69.

The time period during which residual fluorescence is released from a fluorescent substance is generally very short and, therefore, if the distance between the stimulation point 35 and the detection point 36 is long, the optical head 15 and the optical head 65 have to be moved at an extremely high speed in the main scanning direction. However, it is difficult to move the optical head 15 and the optical head 65 provided with optical systems and driven by the endless belt 46 at a high speed. Therefore, it is preferable to set the distance between the stimulation point 35 and the detection point 36 considerably short. Since the optical axes of the convex lens 17 and the convex lens 19 are parallel to each other in the optical head 15 shown in FIG. 2, however, it is difficult to sufficiently shorten the distance L1 because of space constraints. On the other hand, as described above, in this embodiment, since the optical axes of the convex lens 67 and the convex lens 69 are not parallel to each other but lie at a predetermined angle θ to each other, the mirror 66, the mirror 68, the convex lens 67 and the convex lens 69 can be disposed without space constraints so that the distance L2 can be made very short. Therefore, residual fluorescence 25 can be detected in a desired manner and a fluorescent image can be read.

In the thus constituted image reading apparatus according to this embodiment, when a fluorescent image carried in the image carrier 22, for example, an electrophoresis image of a protein molecule labeled with SYPRO Ruby (registered trademark) and carried in a gel support is to be read, the laser beam 4 entering the optical head 65 is reflected by the mirror 66 and is condensed by the convex mirror 67 onto the stimulation point 35 on the image carrier 22. As a result, the fluorescent dye positioned at the stimulation point 35 is excited, thereby releasing fluorescence during stimulation but the image reading apparatus does not detect the fluorescence during stimulation.

When the optical head 65 has been moved by the main scanning pulse motor 45 in the main scanning direction and the stimulation point 35 has reached the detection point 36, residual fluorescence 25 released from the fluorescent dye positioned at the detection point 36 is condensed by the convex lens 69, thereby being made a parallel beam. The residual fluorescence 25 is reflected by the mirror 68, passes through the aperture 24 and advances to the concave mirror 26. The residual fluorescence 25 is condensed by the concave mirror 26 onto the concave mirror 27.

As shown in FIG. 3, residual fluorescence 25 condensed onto the concave mirror 27 is reflected downwardly by the concave mirror 27 and enters a filter unit 27. As a result, light having a wavelength of 473 nm is cut and only light in the wavelength of the residual fluorescence 25 released from the fluorescent substance, for example, SYPRO Ruby (registered trademark), passes through the filter 32c, thereby being photoelectrically detected by the photomultiplier 30.

Since the optical head 65 is moved in the X direction and the Y direction, the whole surface of the image carrier 22 is scanned by the laser beam 4 and residual fluorescence 25 released from the fluorescent dye contained in the image carrier 22 is photoelectrically detected by the photomultiplier 30. As a result, the fluorescent image carried in the image carrier 22 is read and analog image data are produced.

The analog image data produced when the photomultiplier 30 photoelectrically detects the residual fluorescence 25 are converted by the A/D converter 33 into digital image data and the digital data are fed to the image data processing apparatus 34.

On the other hand, when an autoradiographic image regarding locational information of a radioactively labeling substance in a gene obtained using a Southern blot-hybridization method and recorded in a stimulable phosphor layer formed on a stimulable phosphor sheet is to be read, similarly to the embodiment shown in FIGS. 1 to 11, the optical head 15 is removed and the optical head 55 shown in FIG. 11 is mounted. Then, stimulated emission released from a stimulable phosphor is photoelectrically detected and an autoradiographic image is read.

According to this embodiment, in the case of reading a fluorescent image of a specimen labeled with a fluorescent substance and recorded in a gel support or a transfer support, for example, an electrophoresis image of a protein molecule labeled with SYPRO Ruby (registered trademark) and recorded in a gel support, it is possible to prevent the laser beam 4 from generating noise in the image data and improve the S/N ratio because residual fluorescence 25 released from the fluorescent dye which is no longer being irradiated by the laser beam 4 is detected.

Further, according to this embodiment, a fluorescent image is read by leading residual fluorescence 25 released from the fluorescent dye when the optical head 65 has been moved by the distance L2 in the main scanning direction by the main scanning pulse motor 45 after the fluorescent dye was irradiated by the laser beam 4 to the photomultiplier 30 via the convex lens 69, the mirror 68, the concave mirror 26 and the concave mirror 27 and photoelectrically detecting the residual fluorescence 25. Therefore, since it is not required to turn the laser stimulating ray source for detecting the residual fluorescence 25 on and off, a fluorescent image can be read at a high speed.

Furthermore, according to this embodiment, since the optical axes of the convex lens 67 and the convex lens 69 are not parallel to each other but lie at a predetermined angle θ to each other, the mirror 66, the mirror 68, the convex lens 67 and the convex lens 69 can be disposed without space constraints so that the distance L2 can be made considerably short. Residual fluorescence 25 can therefore be detected in a desired manner and a fluorescent image can be read.

Further, according to this embodiment, since the optical head 15 and the optical head 65 are exchangeable, the image reading apparatus can be used in common for an autoradiographic image detecting system, a chemiluminescent image detecting system, an electron microscopic image detecting system and a radiographic diffraction image detecting system using a stimulable phosphor sheet, and the fluorescent image detecting system, which systems are used for similar purposes.

Moreover, according to this embodiment, the optical head 65 is provided with the aperture 24 which is formed so as to allow only residual fluorescence 25 released from a fluorescent dye positioned at the detection point 36 and reflected by the mirror 68 and whose center coincides with the center of the path of the residual fluorescence 25. Therefore, it is possible to cut the stimulating ray, thereby reducing noise in the image data and producing image data based on which an image having high resolution can be reproduced.

Figure 13:
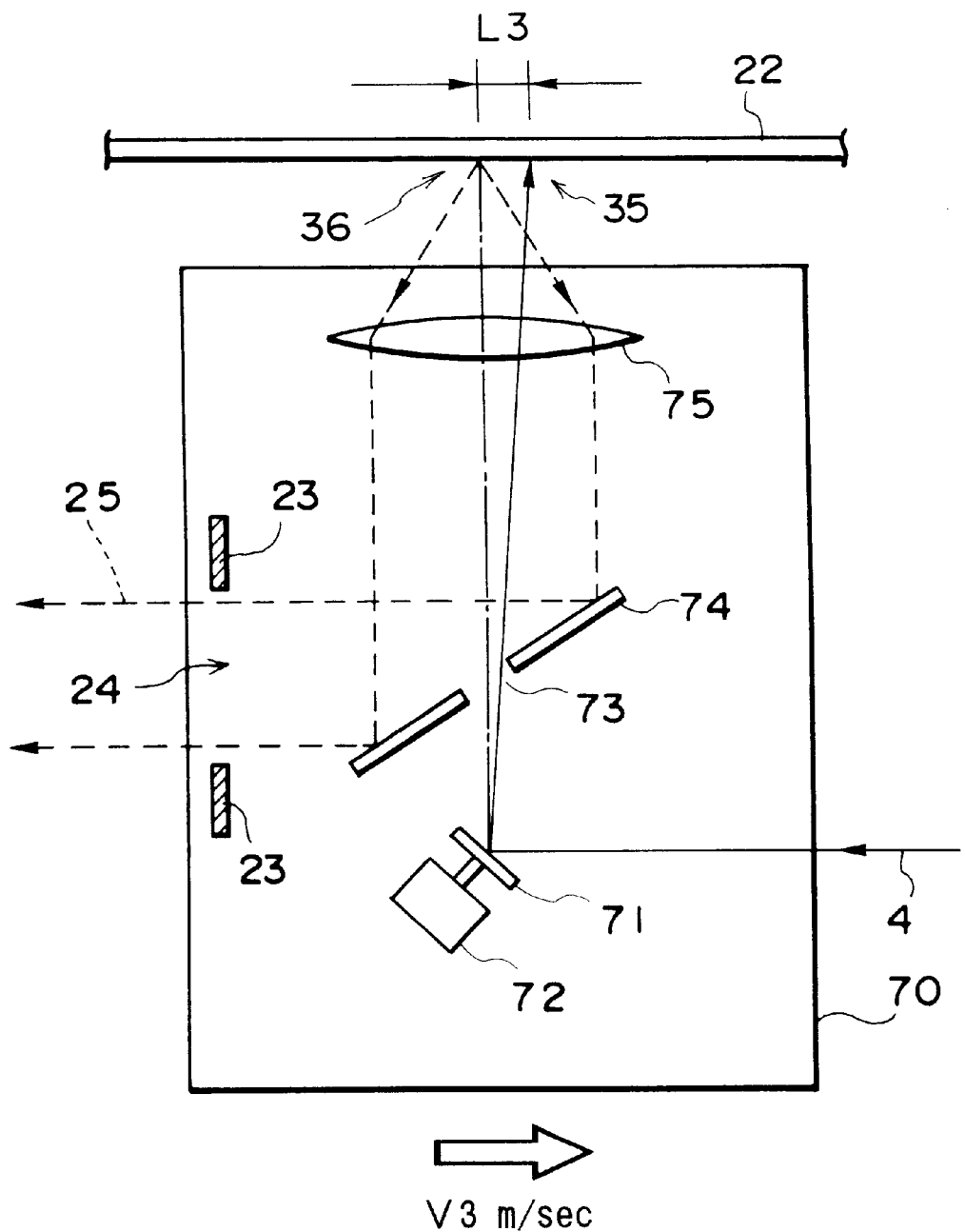
FIG. 13 is a schematic longitudinal cross-sectional view showing the internal structure of an optical head used in an image reading apparatus which is a further preferred embodiment of the present invention.

FIG. 13 is a schematic longitudinal cross-sectional view showing the internal structure of an optical head used for an image reading apparatus which is a further embodiment of the present invention.

As shown in FIG. 13, an optical head 70 according to this embodiment includes a mirror 71, an angle adjusting mechanism 72 for adjusting the angle of the mirror 71, a perforated mirror 74 formed with a hole 73, a convex lens 75 and an aperture member 23. The aperture member 23 is formed with an aperture 24.

As shown in FIG. 13, in this embodiment, when a fluorescent image is to be read, a laser beam 4 is condensed by the mirror 71 onto a stimulation point 35 on the image carrier 22 and fluorescence released from a fluorescent dye positioned at a detection point 36 spaced from the stimulation point 35 by a distance L3 is condensed by the convex lens 75 and led to downstream optical systems.

On the other hand, when an autoradiographic image recorded in a stimulable phosphor layer formed on a stimulable phosphor sheet is to be read, the angle of the mirror 71 is adjusted by the angle adjusting mechanism 72 so that the laser beam impinges at the detection point 36 in FIG. 13.

Similarly to the above described embodiments, in this embodiment, when a fluorescent image, for example, an electrophoresis image of a protein molecule labeled with SYPRO Ruby (registered trademark) and carried in a gel support is to be read, the optical head 70 is moved by the main scanning pulse motor 45 by the distance L3 in the main scanning direction after the fluorescent substance was irradiated by the laser beam 4 and residual fluorescence 25 released from the fluorescent substance when the stimulation point 35 of the image carrier 22 has been moved to the detection point 36 shown in FIG. 13 is condensed by the convex lens 75, led to the photomultiplier 30 via the perforated mirror 74, the aperture 24, the convex mirror 26 and the convex mirror 27 and photoelectrically detected by the photomultiplier 30, thereby reading the fluorescent image.

Similarly to the optical head 15 shown in FIG. 2, the optical head 70 is moved by the main scanning pulse motor 45 in the main scanning direction and the moving speed of the optical head 70 is determined to be V3 meter/second in this embodiment. Therefore, residual fluorescence 25 released from a fluorescent substance when L3/V3 second has passed after the fluorescent dye was irradiated by the laser beam 4 is condensed by the convex lens 75.

In this embodiment, since the angle adjusting mechanism 72 is provided for adjusting the angle of the mirror 71, the mirror 71, the angle adjusting mechanism 72, the perforated mirror 74 and the convex lens 75 can be disposed without space constraints so that the distance L3 can be made considerably short and, therefore, residual fluorescence 25 can be detected in a desired manner and a fluorescent image can be read.

In the thus constituted image reading apparatus according to this embodiment, when a fluorescent image carried in the image carrier 22, for example, an electrophoresis image of a protein molecule labeled with SYPRO Ruby (registered trademark) and carried in a gel support is to be read, the laser beam 4 entering the optical head 70 is reflected by the mirror 71 whose angle is adjusted by the angle adjusting mechanism 72, passes through the hole 73 of the perforated mirror 74 and is condensed by the convex mirror 75 onto the stimulation point 35 on the image carrier 22. As a result, the fluorescent dye positioned at the stimulation point 35 is excited, thereby releasing fluorescence during stimulation but the image reading apparatus does not detect the fluorescence during stimulation.

When the optical head 70 has been moved by the main scanning pulse motor 45 in the main scanning direction and the stimulation point 35 has reached the detection point 36, residual fluorescence 25 released from the fluorescent dye positioned at the detection point 36 is condensed by the convex lens 75, thereby being made a parallel beam. The residual fluorescence 25 is reflected by the perforated mirror 74, passes through the aperture 24 and advances to the concave mirror 26. The residual fluorescence 25 is condensed by the concave mirror 26 onto the concave mirror 27.

As shown in FIG. 3, residual fluorescence 25 condensed onto the concave mirror 27 is reflected downward by the concave mirror 27 and enters a filter unit 27. As a result, light having a wavelength of 473 nm is cut and only light in the wavelength of the residual fluorescence 25 released from the fluorescent substance, for example, SYPRO Ruby (registered trademark), passes through the filter 32c, thereby being photoelectrically detected by the photomultiplier 30.

Since the optical head 70 is moved in the X direction and the Y direction, the whole surface of the image carrier 22 is scanned by the laser beam 4 and residual fluorescence 25 released from the fluorescent dye contained in the image carrier 22 is photoelectrically detected by the photomultiplier 30. As a result, the fluorescent image carried in the image carrier 22 is read and analog image data are produced.

The analog image data produced when the photomultiplier 30 photoelectrically detects the residual fluorescence 25 are converted by the A/D converter 33 into digital image data and the digital data are fed to the image data processing apparatus 34.

On the other hand, when an autoradiographic image regarding locational information of a radioactively labeling substance in a gene obtained using a Southern blot-hybridization method and recorded in a stimulable phosphor layer formed on a stimulable phosphor sheet is to be read, the angle of the mirror 71 is adjusted by the angle adjusting mechanism 72 so that the laser beam 4 impinges at the detection point 36 shown in FIG. 13.

The laser beam 4 entering the optical head 70 is reflected by the mirror 71, passes through the hole 73 of the perforated mirror 74 and is condensed by the convex lens 75 onto the stimulable phosphor layer formed on the stimulable phosphor sheet.

As a result, a stimulable phosphor contained in the stimulable phosphor layer is excited and stimulated emission is released from the stimulable phosphor.

The stimulated emission released from the stimulable phosphor is made a parallel beam by the convex lens 75 and advances to the perforated mirror 74.

The stimulated emission 25 is reflected by the perforated mirror 74, passes through the aperture 24 and advances to the concave mirror 26, thereby being condensed onto the concave mirror 27.

As shown in FIG. 3, the stimulated emission 25 condensed onto the concave mirror 27 is reflected downwardly and enters the filter 32d of the filter unit 28. As a result, light having a wavelength of 640 nm is cut and only light in the wavelength of the stimulated emission passes through the filter 32d, thereby being photoelectrically detected by the photomultiplier 30.

Since the optical head 70 is moved in the X direction and the Y direction, the whole surface of the image carrier 22 is scanned by the laser beam 4 and stimulated emission 25 released from a stimulable phosphor contained in the image carrier 22 is photoelectrically detected by the photomultiplier 30. As a result, an autoradiographic image carried in the image carrier 22 is read and analog image data are produced.

The analog image data produced when the photomultiplier 30 photoelectrically detects the residual fluorescence 25 are converted by the A/D converter 33 into digital image data and the digital data are fed to the image data processing apparatus 34.

According to this embodiment, in the case of reading a fluorescent image of a specimen labeled with a fluorescent substance and recorded in a gel support or a transfer support, for example, an electrophoresis image of a protein molecule labeled with SYPRO Ruby (registered trademark) and recorded in a gel support, it is possible to prevent the laser beam 4 from generating noise in the image data and improve the S/N ratio because residual fluorescence 25 released from the fluorescent dye which is no longer being irradiated by the laser beam 4 is detected.

Further, according to this embodiment, a fluorescent image is read by leading residual fluorescence 25 released from the fluorescent dye when the optical head 70 has been moved by the distance L3 in the main scanning direction by the main scanning pulse motor 45 after the fluorescent dye was irradiated by the laser beam 4 to the photomultiplier 30 via the convex lens 75, the perforated mirror 74, the concave mirror 26 and the concave mirror 27 and photoelectrically detecting the residual fluorescence 25. Therefore, since it is not required to turn the laser stimulating ray source for detecting the residual fluorescence 25 on and off, a fluorescent image can be read at a high speed.

Furthermore, according to this embodiment, since the angle of the mirror 71 can be adjusted by the angle adjusting mechanism 72, the mirror 71, the angle adjusting mechanism 72, the perforated mirror 74 and the convex lens 75 can be disposed without space constraints so that the distance L3 can be made considerably short and, therefore, residual fluorescence 25 can be detected in a desired manner and a fluorescent image can be read.

Furthermore, according to this embodiment, only by controlling the positional relationship between the stimulation point 35 of the image carrier 22 onto which the laser beam 4 is impinged and the detection point 36 using the angle adjusting mechanism 72, the image reading apparatus can be used in common for an autoradiographic image detecting system, a chemiluminescent image detecting system, an electron microscopic image detecting system and a radiographic diffraction image detecting system using a stimulable phosphor sheet, and the fluorescent image detecting system, which systems are used for similar purposes.

Moreover, according to this embodiment, the optical head 70 is provided with the aperture 24 which is formed so as to allow only residual fluorescence 25 released from a fluorescent dye positioned at the detection point 36 and reflected by the perforated mirror 74 and whose center coincides with the center of the path of the residual fluorescence 25. Therefore, it is possible to cut the stimulating ray, thereby reducing noise in the image data and producing image data based on which an image having high resolution can be reproduced.

Figure 14:
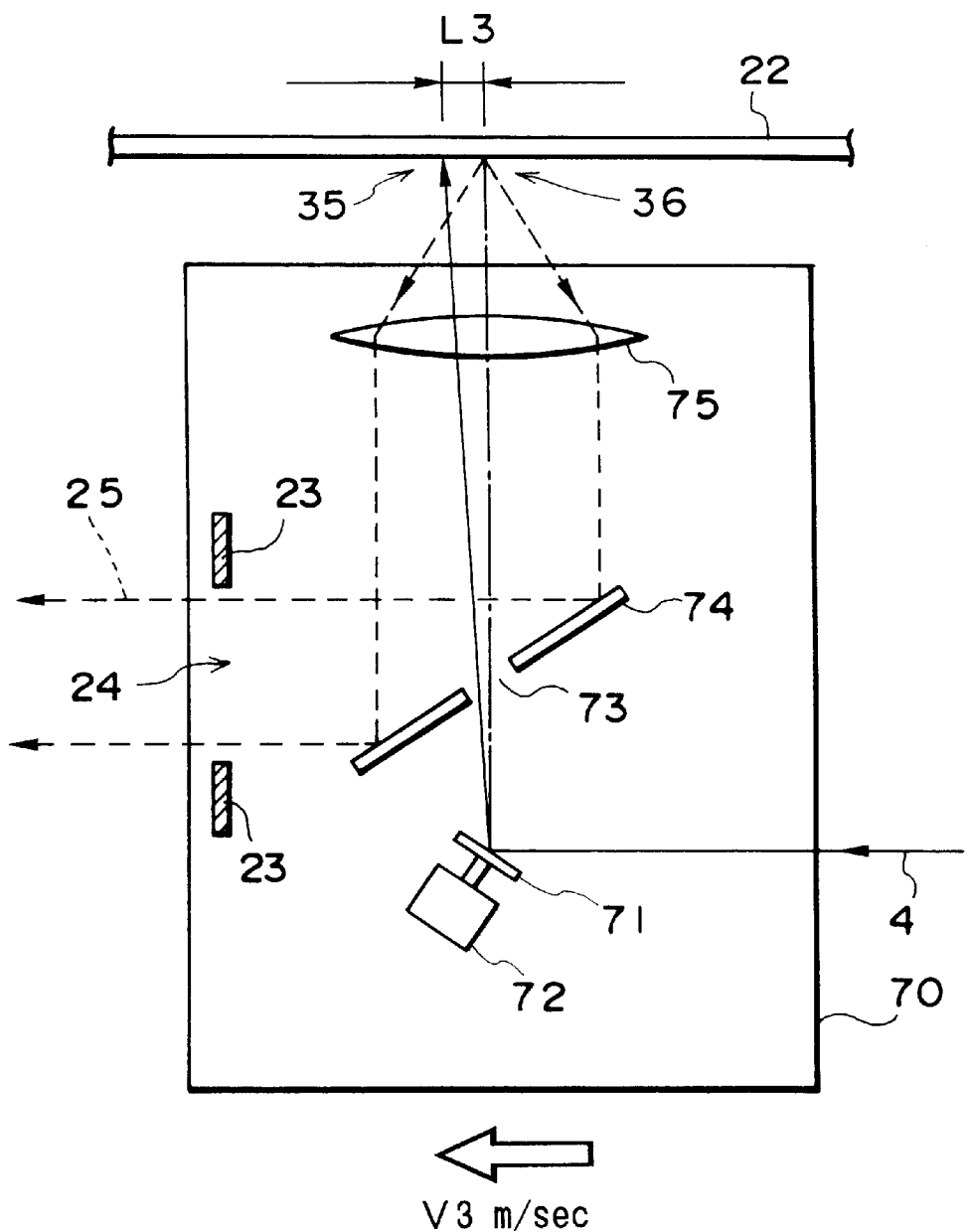
FIG. 14 is a schematic longitudinal cross-sectional view showing another embodiment of the optical head shown in FIG. 13.

FIG. 14 is a schematic longitudinal cross-sectional view showing another example of an optical head usable for the image reading apparatus shown in FIG. 13.

As shown in FIG. 14, in this embodiment, the angle of the mirror 71 is adjusted by the angle adjusting mechanism 72 so that the mirror 71 can direct the laser beam 4 onto a stimulation point 35 on the opposite side of the image carrier 22 to that shown in FIG. 13 with respect to the optical axis of the convex lens 75. Therefore, according to the thus constituted optical head 70, a fluorescence image can be read by detecting residual fluorescence in a desired manner irrespective of the scanning direction.

Figure 15:
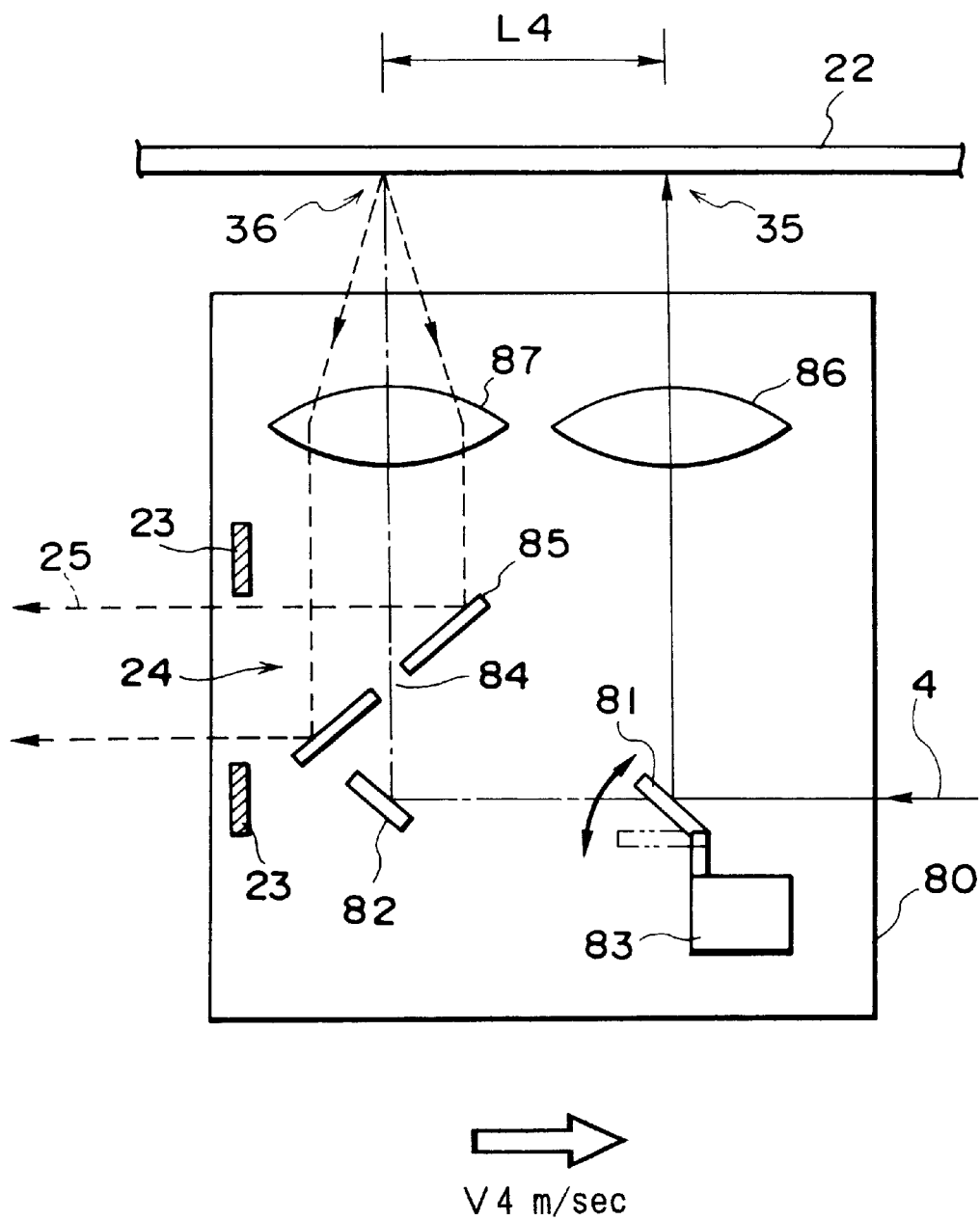
FIG. 15 is a schematic longitudinal cross-sectional view showing the internal structure of an optical head used in an image reading apparatus which is a further preferred embodiment of the present invention.

FIG. 15 is a schematic longitudinal cross-sectional view showing the internal structure of an optical head used for an image reading apparatus which is a further embodiment of the present invention.

As shown in FIG. 15, an optical head 80 includes a mirror 81, a mirror 82, an angle adjusting mechanism 83 for adjusting the angle of the mirror 81, a perforated mirror 85 formed with a hole 84, a convex lens 86, a convex lens 87 and an aperture member 23. The aperture member 23 is formed with an aperture 24.

In this embodiment, when a fluorescent image, for example, an electrophoresis image of a protein molecule labeled with SYPRO Ruby (registered trademark) and carried in a gel support is to be read, as shown in FIG. 15, the angle of the mirror 81 is adjusted by the angle adjusting mechanism 83 so that the mirror 81 leads an incident laser beam 4 to a stimulation point 35 on the image carrier 22, and fluorescence 25 released from a fluorescent dye positioned at a detection point 36 spaced from the stimulation point 35 by a distance L4 in FIG. 15 is condensed by the convex lens 87 and led to downstream optical systems.

Similarly to the above described embodiments, in this embodiment, when a fluorescent image, for example, an electrophoresis image of a protein molecule labeled with SYPRO Ruby (registered trademark) and carried in a gel support is to be read, the optical head 80 is moved by the main scanning pulse motor 45 by the distance L4 in the main scanning direction after the fluorescent substance was irradiated by the laser beam 4 and residual fluorescence 25 released from the fluorescent substance when the stimulation point 35 of the image carrier 22 has been moved to the detection point 36 shown in FIG. 15 is condensed by the convex lens 87, led to the photomultiplier 30 via the perforated mirror 85, the aperture 24, the convex mirror 26 and the convex mirror 27 and photoelectrically detected by the photomultiplier 30, thereby reading the fluorescent image.

Similarly to the optical head 15 shown in FIG. 2, the optical head 80 is moved by the main scanning pulse motor 45 in the main scanning direction and the moving speed of the optical head 80 is determined to be V4 meter/second in this embodiment. Therefore, residual fluorescence 25 released from a fluorescent substance when L4/V4 second has passed after the fluorescent dye was irradiated by the laser beam 4 is condensed by the convex lens 87.

In the thus constituted image reading apparatus according to this embodiment, when a fluorescent image carried in the image carrier 22, for example, an electrophoresis image of a protein molecule labeled with SYPRO Ruby (registered trademark) and carried in a gel support is to be read, the laser beam 4 entering the optical head 80 is reflected by the mirror 81 whose angle is adjusted by the angle adjusting mechanism 83 and is condensed by the convex mirror 86 onto the stimulation point 35 on the image carrier 22. As a result, the fluorescent dye positioned at the stimulation point 35 is excited, thereby releasing "fluorescence during stimulation" but the image reading apparatus does not detect the "fluorescence during stimulation".

When the optical head 80 has been moved by the main scanning pulse motor 45 in the main scanning direction and the stimulation point 35 has reached the detection point 36, residual fluorescence 25 released from the fluorescent dye positioned at the detection point 36 is condensed by the convex lens 87, thereby being made a parallel beam. The residual fluorescence 25 is reflected by the perforated mirror 85, passes through the aperture 24 and advances to the concave mirror 26. The residual fluorescence 25 is condensed by the concave mirror 26 onto the concave mirror 27.

As shown in FIG. 3, residual fluorescence 25 condensed onto the concave mirror 27 is reflected downward by the concave mirror 27 and enters a filter unit 27. As a result, light having a wavelength of 473 nm is cut and only light in the wavelength of the residual fluorescence 25 released from the fluorescent substance, for example, SYPRO Ruby (registered trademark), passes through the filter 32c, thereby being photoelectrically detected by the photomultiplier 30.

Since the optical head 80 is moved in the X direction and the Y direction, the whole surface of the image carrier 22 is scanned by the laser beam 4 and residual fluorescence 25 released from the fluorescent dye contained in the image carrier 22 is photoelectrically detected by the photomultiplier 30. As a result, the fluorescent image carried in the image carrier 22 is read and analog image data are produced.

The analog image data produced when the photomultiplier 30 photoelectrically detects the residual fluorescence 25 are converted by the A/D converter 33 into digital image data and the digital data are fed to the image data processing apparatus 34.

On the other hand, when an autoradiographic image regarding locational information of a radioactively labeling substance in a gene obtained using a Southern blot-hybridization method and recorded in a stimulable phosphor layer formed on a stimulable phosphor sheet is to be read, the mirror 81 is retracted from the path of the laser beam 4 by the angle adjusting mechanism 83.

Figure 16:
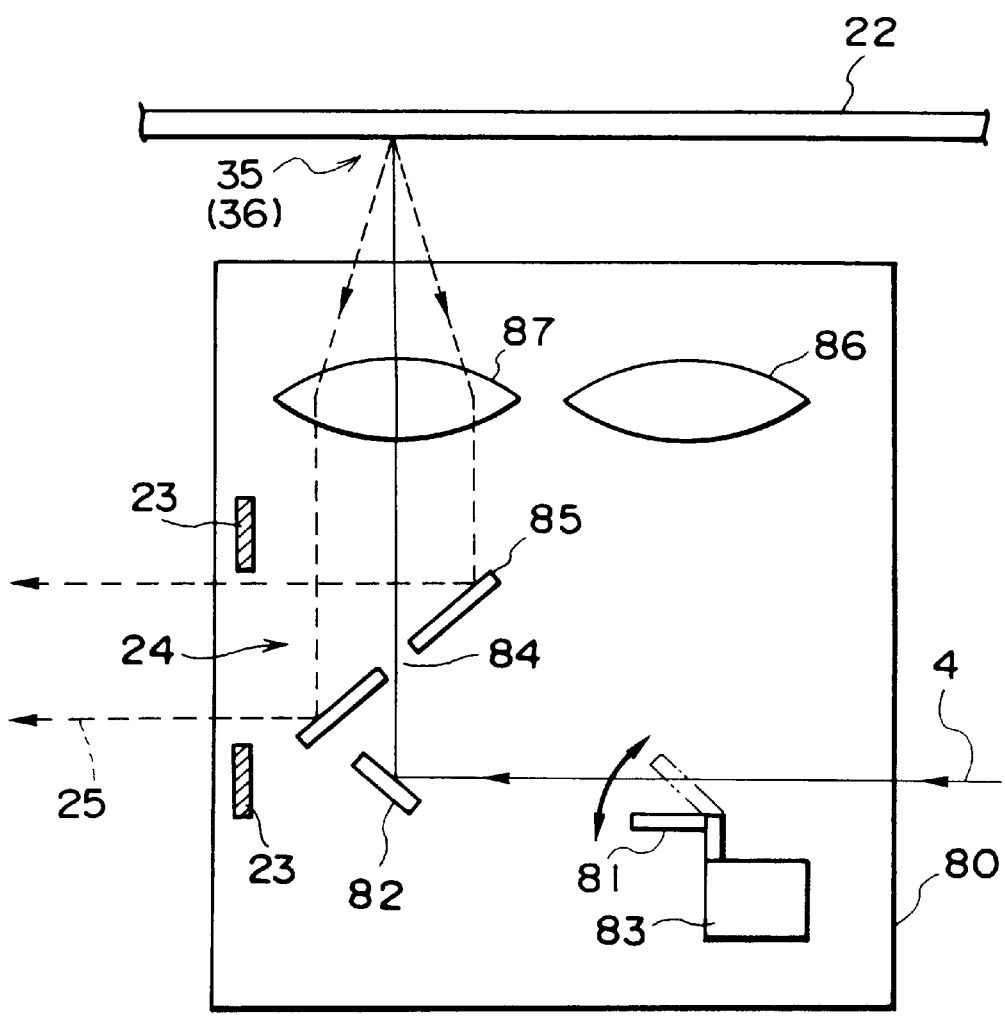
FIG. 16 is a schematic longitudinal cross-sectional view showing an optical head whose mirror is retracted from the path of a laser beam.

FIG. 16 is a schematic longitudinal cross-sectional view showing the optical head 80 with the mirror 81 retracted from the path of the laser beam 4.

The laser beam 4 entering the optical head 80 is reflected by the mirror 82, passes through the hole 84 of the perforated mirror 85 and is condensed by the convex lens 87 onto the stimulable phosphor layer formed on the stimulable phosphor sheet.

As a result, a stimulable phosphor contained in the stimulable phosphor layer is excited and stimulated emission is released from the stimulable phosphor.

The stimulated emission released from the stimulable phosphor is made a parallel beam by the convex lens 87 and enters the perforated mirror 85.

The stimulated emission 25 is reflected by the perforated mirror 85, passes through the aperture 24 and advances to the concave mirror 26, thereby being condensed onto the concave mirror 27.

As shown in FIG. 3, the stimulated emission 25 condensed onto the concave mirror 27 is reflected downward and enters the filter 32d of the filter unit 28. As a result, light having a wavelength of 640 nm is cut and only light in the wavelength of the stimulated emission passes through the filter 32d, thereby being photoelectrically detected by the photomultiplier 30.

Since the optical head 80 is moved in the X direction and the Y direction, the whole surface of the image carrier 22 is scanned by the laser beam 4 and stimulated emission 25 released from the stimulable phosphor contained in the image carrier 22 is photoelectrically detected by the photomultiplier 30. As a result, the autoradiographic image carried in the image carrier 22 is read and analog image data are produced.

The analog image data produced when the photomultiplier 30 photoelectrically detects the stimulated emission 25 are converted by the A/D converter 33 into digital image data and the digital data are fed to the image data processing apparatus 34.

According to this embodiment, in the case of reading a fluorescent image of a specimen labeled with a fluorescent substance and recorded in a gel support or a transfer support, for example, an electrophoresis image of a protein molecule labeled with SYPRO Ruby (registered trademark) and recorded in a gel support, it is possible to prevent the laser beam 4 from generating noise in the image data and improve the S/N ratio because residual fluorescence 25 released from the fluorescent dye which is no longer being irradiated by the laser beam 4 is detected.

Further, according to this embodiment, a fluorescent image is read by leading residual fluorescence 25 released from the fluorescent dye when the optical head 80 has been moved by the distance L4 in the main scanning direction by the main scanning pulse motor 45 after the fluorescent dye was irradiated by the laser beam 4 to the photomultiplier 30 via the convex lens 87, the perforated mirror 85, the concave mirror 26 and the concave mirror 27 and photoelectrically detecting the residual fluorescence 25. Therefore, since it is not required to turn the laser stimulating ray source for detecting the residual fluorescence 25 on and off, a fluorescent image can be read at a high speed.

Furthermore, according to this embodiment, only by positioning the mirror in the path of the laser beam 4 or retracting it from the path of the laser beam 4 using the angle adjusting mechanism 83, the image reading apparatus can be used in common for an autoradiographic image detecting system, a chemiluminescent image detecting system, an electron microscopic image detecting system and a radiographic diffraction image detecting system using a stimulable phosphor sheet, and the fluorescent image detecting system, which systems are used for similar purposes.

Moreover, according to this embodiment, the optical head 80 is provided with the aperture 24 which is formed so as to allow only residual fluorescence 25 released from a fluorescent dye positioned at the detection point 36 and reflected by the perforated mirror 85 and whose center coincides with the center of the path of the residual fluorescence 25. Therefore, it is possible to cut the stimulating ray, thereby reducing noise in the image data and producing image data based on which an image having high resolution can be reproduced.

Figure 17:
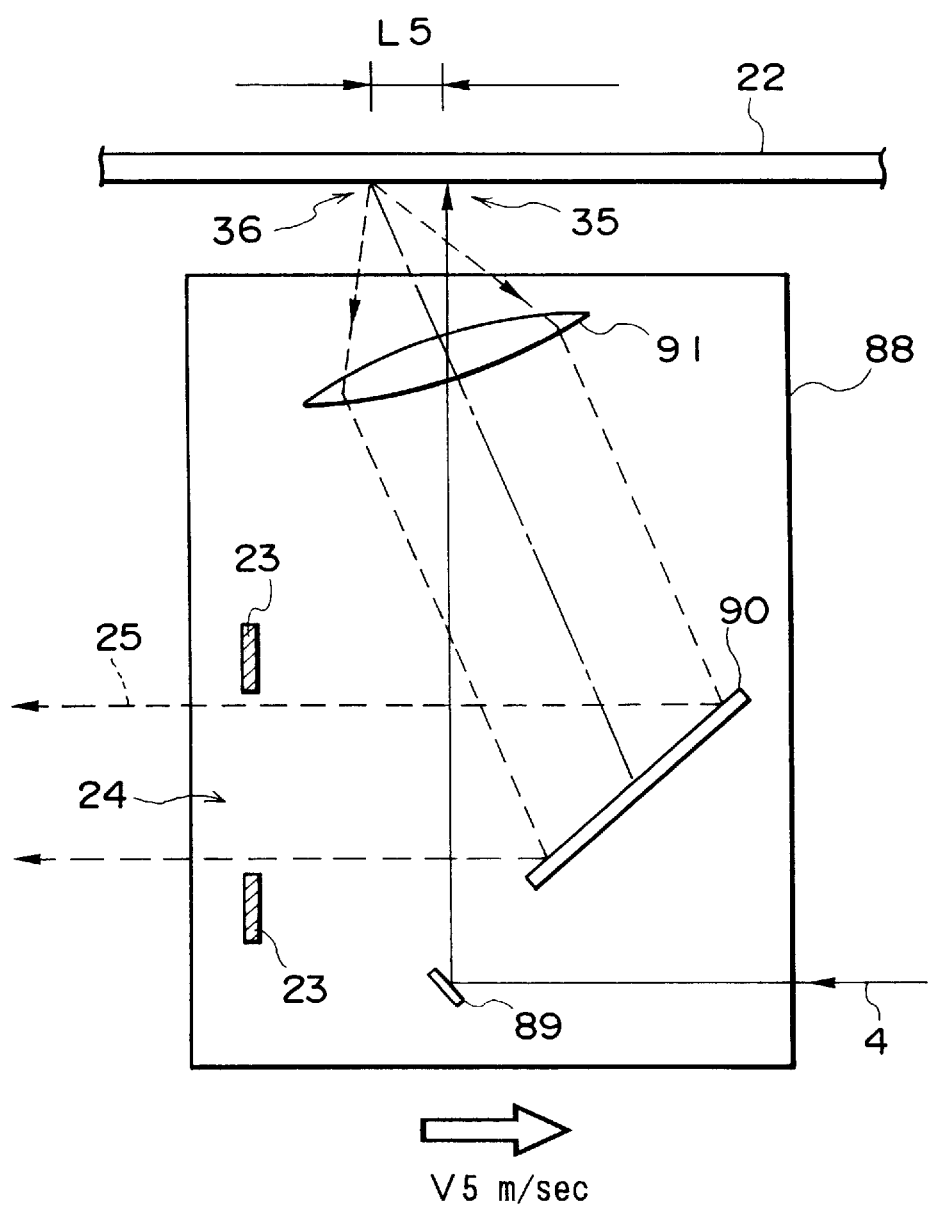
FIG. 17 is a schematic longitudinal cross-sectional view showing the internal structure of an optical head used in an image reading apparatus which is a further preferred embodiment of the present invention.

FIG. 17 is a schematic longitudinal cross-sectional view showing the internal structure of an optical head used for an image reading apparatus which is a further embodiment of the present invention.

As shown in FIG. 17, an optical head 88 according to this embodiment includes a mirror 89 for reflecting a laser beam 4 and leading it to the image carrier 22, a mirror 90 for reflecting light released from the image carrier 22, a convex lens 91 and an aperture member 23. The aperture member 23 is formed with an aperture 24.

As shown in FIG. 17, in this embodiment, the optical axis of the convex lens 91 is not perpendicular to the image carrier 22 but lie at a predetermined angle thereto and both the laser beam 4 reflected by the mirror 89 and fluorescence 25 released from the image carrier 22 pass through the convex lens 91. Specifically, since the path of the laser beam 4 reflected by the mirror 89 is substantially perpendicular to the image carrier 22, the laser beam 4 enters the convex lens 91 whose optical axis is at a predetermined angle to the image carrier 22 at a predetermined angle, thereby being condensed onto a stimulating point 35 on the image carrier 22, while fluorescence 25 released from a fluorescent dye positioned at a detection point 36 spaced from the stimulating point 35 by a distance L5 is condensed by the convex lens 91 onto the mirror 90, is reflected by the mirror 90, passes through the aperture 24 formed in the aperture member 23 and is led to downstream optical systems.

Similarly to the above described embodiments, in this embodiment, when a fluorescent image, for example, an electrophoresis image of a protein molecule labeled with SYPRO Ruby (registered trademark) and carried in a gel support is to be read, the optical head 88 is moved by the main scanning pulse motor 45 by the distance L5 in the main scanning direction after a fluorescent substance was irradiated by the laser beam 4 and residual fluorescence 25 released from the fluorescent substance when the stimulation point 35 on the image carrier 22 has been moved to the detection point 36 shown in FIG. 17 is condensed by the convex lens 91, led to the photomultiplier 30 via the mirror 90, the aperture 24, the convex mirror 26 and the convex mirror 27, and photoelectrically detected by the photomultiplier 30, thereby reading a fluorescent image.

Similarly to the optical head 15 shown in FIG. 2, the optical head 88 is moved by the main scanning pulse motor 45 in the main scanning direction and the moving speed of the optical head 88 is determined to be V5 meter/second in this embodiment. Therefore, residual fluorescence 25 released from a fluorescent substance when L5/V5 second has passed after the fluorescent dye was irradiated by the laser beam 4 is condensed by the convex lens 91.

In the thus constituted image reading apparatus according to this embodiment, the laser beam 4 entering the optical head 88 is reflected by the mirror 89 and is condensed by the convex lens 91 onto the stimulation point 36 on the image carrier 22. As a result, the fluorescent dye positioned at the stimulation point 35 is excited, thereby releasing fluorescence during stimulation but the image reading apparatus does not detect the fluorescence during stimulation.

When the optical head 88 has been moved by the main scanning pulse motor 45 in the main scanning direction and the stimulation point 35 has reached the detection point 36, residual fluorescence 25 released from the fluorescent dye positioned at the detection point 36 is condensed by the convex lens 91, thereby being made a parallel beam. The residual fluorescence 25 is reflected by the mirror 90, passes through the aperture 24 and advances to the concave mirror 26. The residual fluorescence 25 is condensed by the concave mirror 26 onto the concave mirror 27.

As shown in FIG. 3, residual fluorescence 25 condensed onto the concave mirror 27 is reflected downward by the concave mirror 27 and enters a filter unit 27. As a result, light having a wavelength of 473 nm is cut and only light in the wavelength of the residual fluorescence 25 released from the fluorescent substance, for example, SYPRO Ruby (registered trademark), passes through the filter 32c, thereby being photoelectrically detected by the photomultiplier 30.

Since the optical head 88 is moved in the X direction and the Y direction, the whole surface of the image carrier 22 is scanned by the laser beam 4 and residual fluorescence 25 released from the fluorescent dye contained in the image carrier 22 is photoelectrically detected by the photomultiplier 30. As a result, the fluorescent image carried in the image carrier 22 is read and analog image data are produced.

The analog image data produced when the photomultiplier 30 photoelectrically detects the residual fluorescence 25 are converted by the A/D converter 33 into digital image data and the digital data are fed to the image data processing apparatus 34.

According to this embodiment, in the case of reading a fluorescent image of a specimen labeled with a fluorescent substance and recorded in a gel support or a transfer support, for example, an electrophoresis image of a protein molecule labeled with SYPRO Ruby (registered trademark) and recorded in a gel support, it is possible to prevent the laser beam 4 from generating noise in the image data and improve the S/N ratio because residual fluorescence 25 released from the fluorescent dye which is no longer being irradiated by the laser beam 4 is detected.

Further, according to this embodiment, a fluorescent image is read by leading residual fluorescence 25 released from the fluorescent dye when the optical head 70 has been moved by the distance L5 in the main scanning direction by the main scanning pulse motor 45 after the fluorescent dye was irradiated by the laser beam 4 to the photomultiplier 30 via the convex lens 91, the mirror 90, the concave mirror 26 and the concave mirror 27 and photoelectrically detecting the residual fluorescence 25. Therefore, since it is not required to turn the laser stimulating ray source for detecting the residual fluorescence 25 on and off, a fluorescent image can be read at a high speed.

Further, according to this embodiment, since the axis of the convex lens 91 lies at a predetermined angle to the image carrier 22, the convex lens 91 can serve as a lens for condensing the laser beam 4 and a lens for condensing fluorescence 25 released from the image carrier 22 and, therefore, since the number of parts constituting the optical head 88 can be decreased, it is possible to reduce the cost and weight of the optical head, thereby reducing the load on the main scanning pulse motor 45 for moving the optical head 88.

Furthermore, according to this embodiment, since the mirror 90 is used instead of a perforated mirror, light can be condensed with improved efficiency.

Moreover, according to this embodiment, the optical head 88 is provided with the aperture 24 which is formed so as to allow only residual fluorescence 25 released from a fluorescent dye positioned at the detection point 36 and reflected by the mirror 90 and whose center coincides with the center of the path of the residual fluorescence 25. Therefore, it is possible to cut the stimulating ray, thereby reducing noise in the image data and producing image data based on which an image having high resolution can be reproduced.

Figure 18:
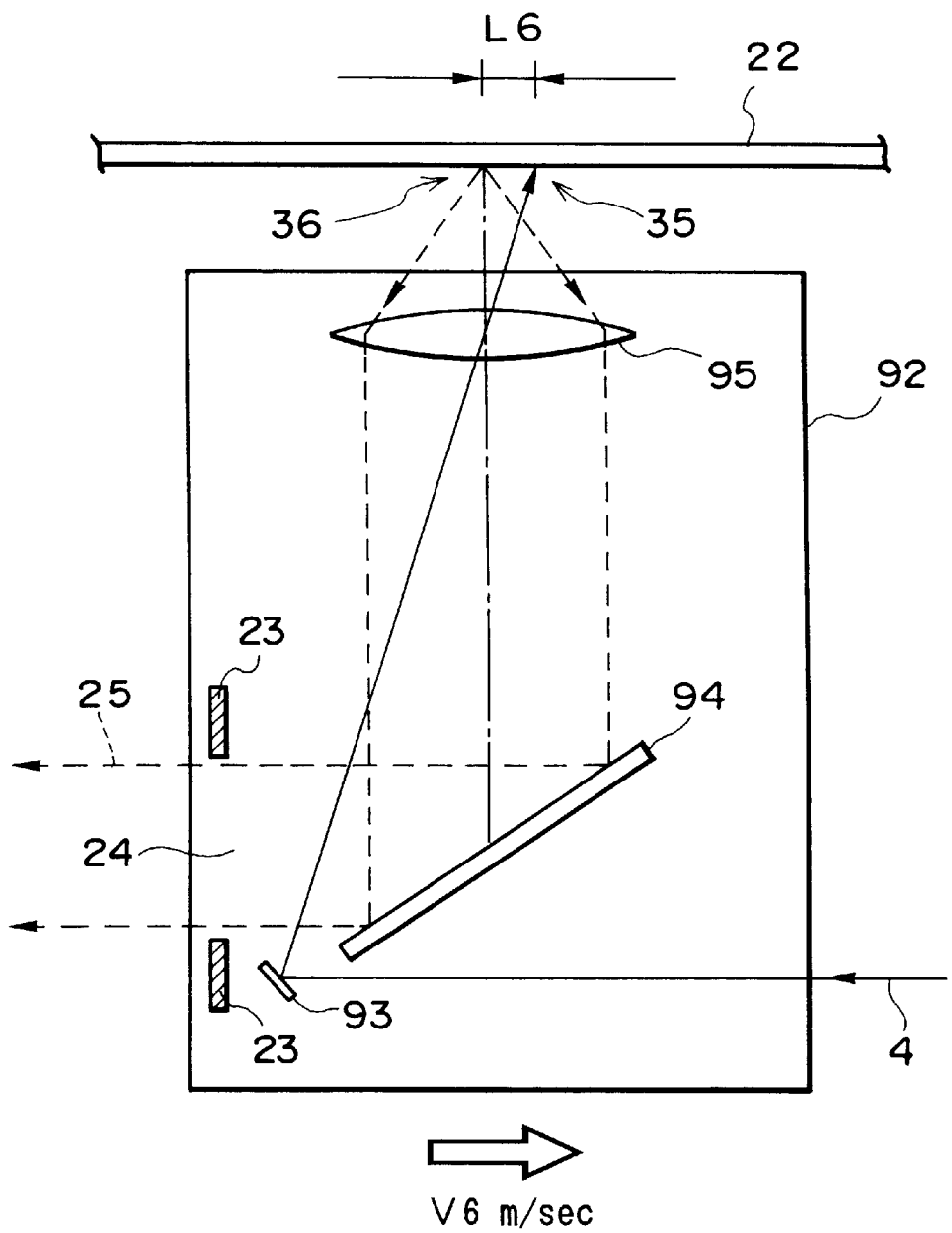
FIG. 18 is a schematic longitudinal cross-sectional view showing the internal structure of an optical head used in an image reading apparatus which is a further preferred embodiment of the present invention.

FIG. 18 is a schematic longitudinal cross-sectional view showing the internal structure of an optical head used for an image reading apparatus which is a further embodiment of the present invention.

As shown in FIG. 18, an optical head 92 according to this embodiment includes a mirror 93 for reflecting a laser beam 4 and leading it to the image carrier 22, a mirror 94 for reflecting light released from the image carrier 22, a convex lens 95 and an aperture member 23. The aperture member 23 is formed with an aperture 24.

As shown in FIG. 18, in this embodiment, the optical axis of the convex lens 95 is substantially perpendicular to the image carrier 22 and a laser beam 4 reflected by the mirror 93 enters the convex lens 95 at a predetermined angle. Both the laser beam 4 reflected by the mirror 93 and residual fluorescence 25 released from the image carrier 22 passes through the convex lens 95. Specifically, the laser beam 4 reflected by the mirror 93 impinges onto the convex lens 95 at a predetermined angle and is condensed by the convex lens 95 onto a stimulation point 35 on the image carrier 22, while residual fluorescence 25 released from a fluorescent dye positioned at a detection point 36 spaced from the stimulating point 35 by a distance L6 is condensed by the convex lens 95 onto the mirror 94, is reflected by the mirror 96, passes through the aperture 24 formed in the aperture member 23 and is led to downstream optical systems.

Similarly to the above described embodiments, in this embodiment, when a fluorescent image, for example, an electrophoresis image of a protein molecule labeled with SYPRO Ruby (registered trademark) and carried in a gel support is to be read, the optical head 92 is moved by the main scanning pulse motor 45 by the distance L6 in the main scanning direction after the fluorescent substance was irradiated by the laser beam 4 and residual fluorescence 25 released from the fluorescent substance when the stimulation point 35 on the image carrier 22 has been moved to the detection point 36 shown in FIG. 17 is condensed by the convex lens 95, led to the photomultiplier 30 via the mirror 94, the aperture 24, the convex mirror 26 and the convex mirror 27 and photoelectrically detected by the photomultiplier 30, thereby reading the fluorescent image.

Similarly to the optical head 15 shown in FIG. 2, the optical head 92 is moved by the main scanning pulse motor 45 in the main scanning direction and the moving speed of the optical head 92 is determined to be V6 meter/second in this embodiment. Therefore, residual fluorescence 25 released from a fluorescent substance when L6/V6 second has passed after the fluorescent dye was irradiated by the laser beam 4 is condensed by the convex lens 95.

In the thus constituted image reading apparatus according to this embodiment, the laser beam 4 entering the optical head 92 is reflected by the mirror 93 and is condensed by the convex lens 95 onto the stimulation point 36 on the image carrier 22. As a result, a fluorescent dye positioned at the stimulation point 35 is excited, thereby releasing fluorescence during stimulation but the image reading apparatus does not detect the fluorescence during stimulation.

When the optical head 92 has been moved by the main scanning pulse motor 45 in the main scanning direction and the stimulation point 35 has reached the detection point 36, residual fluorescence 25 released from the fluorescent dye positioned at the detection point 36 is condensed by the convex lens 95, thereby being made a parallel beam. The residual fluorescence 25 is reflected by the mirror 94, passes through the aperture 24 and advances to the concave mirror 26. The residual fluorescence 25 is condensed by the concave mirror 26 onto the concave mirror 27.

As shown in FIG. 3, residual fluorescence 25 condensed onto the concave mirror 27 is reflected downwardly by the concave mirror 27 and enters a filter unit 27. As a result, light having a wavelength of 473nm is cut and only light in the wavelength of the residual fluorescence 25 released from the fluorescent substance, for example, SYPRO Ruby (registered trademark), passes through the filter 32c, thereby being photoelectrically detected by the photomultiplier 30.

Since the optical head 92 is moved in the X direction and the Y direction, the whole surface of the image carrier 22 is scanned by the laser beam 4 and residual fluorescence 25 released from the fluorescent dye contained in the image carrier 22 is photoelectrically detected by the photomultiplier 30. As a result, the fluorescent image carried in the image carrier 22 is read and analog image data are produced.

The analog image data produced when the photomultiplier 30 photoelectrically detects the residual fluorescence 25 are converted by the A/D converter 33 into digital image data and the digital data are fed to the image data processing apparatus 34.

According to this embodiment, in the case of reading a fluorescent image of a specimen labeled with a fluorescent substance and recorded in a gel support or a transfer support, for example, an electrophoresis image of a protein molecule labeled with SYPRO Ruby (registered trademark) and recorded in a gel support, it is possible to prevent the laser beam 4 from generating noise in the image data and improve the S/N ratio because residual fluorescence 25 released from the fluorescent dye which is no longer being irradiated by the laser beam 4 is detected.

Further, according to this embodiment, since the convex lens 95 can serve as a lens for condensing the laser beam 4 and a lens for condensing fluorescence 25 released from the image carrier 22, the number of parts constituting the optical head 92 can be decreased and, therefore, it is possible to reduce the cost and weight of the optical head, thereby reducing the load on the main scanning pulse motor 45 for moving the optical head 94.

Furthermore, according to this embodiment, since the mirror 94 is used instead of a perforated mirror, light can be condensed with improved efficiency.

Moreover, according to this embodiment, the optical head 94 is provided with the aperture 24 which is formed so as to allow only residual fluorescence 25 released from the fluorescent dye positioned at the detection point 36 and reflected by the mirror 96 and whose center coincides with the center of the path of the residual fluorescence 25. Therefore, it is possible to cut the stimulating ray, thereby reducing noise in the image data and producing image data based on which an image having high resolution can be reproduced.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, explanation was made with regard to the photoelectrical reading of a fluorescent image recorded in a gel support by lableing a protein molecule electrophoresed on a gel support with a fluorescent dye, and an electrophoresis image of a gene obtained using by a Southern blot-hybridization method and recorded in a stimulable phosphor layer formed on a stimulable phosphor sheet in accordance with the autoradiographic image detecting system. However, the present invention is not limited to such image reading but can also be applied to various other types of image reading. Specifically, the present invention can also be applied to reading of other images of fluorescent substances such as an electrophoresis image of a gene obtained using a Southern blot-hybridization method and recorded in a gel support or a transfer support in accordance with the fluorescent detection system or images for the separation or identification of a protein or the estimation of the molecular weight or properties of a protein or the like, autoradiographic images of a protein produced by thin layer chromatography (TLC) and recorded in the stimulable phosphor layer formed on a stimulable phosphor sheet, an autoradiographic image produced by polyacrylamide gel electrophoresis for the separation or identification of a protein or the estimation of the molecular weight or properties of a protein or the like and recorded in the stimulable phosphor layer formed on a stimulable phosphor sheet, and an autoradiographic image recorded in the stimulable phosphor layer formed on a stimulable phosphor sheet for studying the metabolism, absorption, excretion path and state of a substance introduced into a test mouse. Further, the present invention is applicable to reading of an electron beam transmission image or an electron beam diffraction image of a metal or nonmetal produced by an electron microscope and an electron microscope image of tissue of an organism recorded in the stimulable phosphor layer formed on a stimulable phosphor sheet, a radiographic diffraction image of a metal or nonmetal recorded in the stimulable phosphor layer formed on a stimulable phosphor sheet, and a chemiluminescent image recorded in the stimulable phosphor layer formed on a stimulable phosphor sheet.

Moreover, in the above described embodiments, although the image reading apparatus includes the first laser stimulating ray source 1, the second laser stimulating ray source 2 and the third laser stimulating ray source 3, it is not absolutely necessary for the image reading apparatus to include three laser stimulating ray sources and it is sufficient for the image reading apparatus to be able to read a fluorescent image carried in a gel support or a transfer support, and at least one kind of image including an autoradiographic image regarding locational information of a radioactively labeling substance and recorded in the stimulable phosphor layer formed on a stimulable phosphor sheet, an electron beam transmission image or an electron beam diffraction image of a metal or nonmetal and an electron microscope image of tissue of an organism recorded in the stimulable phosphor layer formed on a stimulable phosphor sheet, a radiographic diffraction image of a metal or nonmetal recorded in the stimulable phosphor layer formed on a stimulable phosphor sheet, and a chemiluminescent image recorded in the stimulable phosphor layer formed on a stimulable phosphor sheet. For example, the second laser stimulating ray source 2 may be omitted or the image reading apparatus may be constituted by providing only the first laser stimulating ray source 1 so as to read a fluorescent image produced by labeling a specimen with Cy5 (registered trademark) or the like, which can be efficiently excited by a laser beam having a wavelength of 640 nm, an autoradiographic image regarding locational information, an electron microscope image, a radiographic diffraction image and chemiluminescent image recorded in the stimulable phosphor layer formed on a stimulable phosphor sheet.

Furthermore, in the above described embodiments, although a semiconductor laser beam source for emitting a laser beam 4 having a wavelength of 640 nm is employed as the first laser stimulating ray source 1, a He—Ne laser beam source for emitting a laser beam 4 having a wavelength of 633 nm or a semiconductor laser beam source for emitting a laser beam 4 having a wavelength of 635 nm may be employed instead of the semiconductor laser beam source for emitting a laser beam 4 having a wavelength of 640 nm.

Moreover, in the above described embodiment, a laser beam source for emitting a laser beam 4 having a wavelength of 532 nm is used as the second laser stimulating ray source 2 and a laser beam source for emitting a laser beam 4 having a wavelength of 473 nm is used as the third laser stimulating ray source 3. However, depending upon the kind of a fluorescent substance, a laser beam source for emitting a laser beam 4 having a wavelength of 530 to 540 nm may be used as the second laser stimulating ray source 2 and a laser beam source for emitting a laser beam 4 having a wavelength of 470 to 480 nm, for example, an argon laser beam source for emitting a laser beam 4 having a wavelength of 488 nm, may be used as the third laser stimulating ray source 3.

Further, in the above described embodiments, the entire surface of the image carrier 22 is scanned by the laser beam 4 by moving the optical head 15, 55, 65, 70, 80, 88, 92 using a scanning mechanism, while holding the stage 20 stationary. However, the entire surface of the image carrier 22 may be scanned by the laser beam 4 by moving the stage 20, while holding the optical head 15, 55, 65, 70, 80, 88, 92 stationary or by moving the optical head 15, 55, 65, 70, 80, 88, 92 only in the X direction in FIG. 1 and moving the stage 20 in the Y direction. Moreover, the entire surface of the image carrier 22 may be scanned by the laser beam 4 by constituting the stage 20 and the image carrier 22 to be rotatable, and rotating them, while moving the optical head 15, 55, 65, 70, 80, 88, 92 in the direction normal to the center axis of rotation.

Furthermore, in the embodiment shown in FIGS. 15 and 16, although the mirror 81, the convex lens 86, the mirror 82, the perforated mirror 85 and the convex lens 87 are disposed so that the optical axis of the convex lens 86 is parallel to that of the convex lens 87, the mirror 81, the convex lens 86, the mirror 82, the perforated mirror 85 and the convex lens 87 may be disposed so that the optical axis of the convex lens 86 is at a predetermined angle to that of the convex lens 87. According to such configuration, the distance L4 can be determined coniderably short without space constraints and a large amount of residual fluorescence 25 can be detected.

Further, although the perforated mirrors 58, 74, 85 formed with the holes 57, 73, 84 are used in the above described embodiments, each mirror can be formed with a coating capable of transmitting the laser beam 4 instead of the hole 57, 73, 84.

Moreover, the photomultiplier 30 is employed as a light detector to photoelectrically detect fluorescence or stimulated emission released from the image carrier 2 in the above described embodiments. However, it is sufficient for the light detector used in the present invention to be able to photoelectrically detect fluorescence or stimulated emission and it is possible to employ a light detector such as a photodiode and a CCD instead of the photomultiplier 30.

Furthermore, in the above described embodiments, although each of the optical heads 15, 55, 65, 70, 80, 88, 92 is provided with the aperture member 23 formed with the aperture 24, it is not absolutely necessary to provide the aperture member 23 formed with the aperture 24 and the aperture member 23 may be omitted.

Further, in the above described embodiments, although each of the optical heads 15, 55, 65, 70, 80, 88, 92 is provided with the aperture member 23 formed with the aperture 24, it is not absolutely necessary to provide the aperture member 23 in the optical heads 15, 55, 65, 70, 80, 88, 92 and the aperture member 23 may be provided in the light path between each of the optical heads 15, 55, 65, 70, 80, 88, 92 and the photomultiplier 30.

Furthermore, in the embodiment shown in FIG. 17, the optical axis of the convex lens 91 is not perpendicular to the image carrier 22 but lies at a predetermined angle thereto, while the laser beam 4 enters the image carrier 22 substantially perpendicularly, and in the embodiment shown in FIG. 18, the optical axis of the convex lens 95 is substantially perpendicular to the image carrier 22, while the laser beam 4 does not enter the image carrier 22 perpendicularly but enters it at a predetermined angle. However, it is not absolutely necessary to determine one of the optical axis of the convex lens and the incident direction of the laser beam 4 to be perpendicular to the image carrier 22 in this manner and both the optical axis of the convex lens and the incident direction of the laser beam 4 may be determined to form predetermined angles with the image carrier 22.

According to the present invention, it is possible to provide an image reading apparatus which can efficiently read a fluorescent image at a high S/N ratio by detecting residual fluorescence released from a fluorescent substance after the completion of irradiation with a stimulating ray.

What is claimed is:

1. An image reading apparatus comprising at least one laser stimulating ray source, a stage on which an image carrier can be placed, a scanning mechanism for scanning the image carrier with the laser beam emitted from the at least one laser stimulating ray source, thereby stimulating the image carrier with the laser beam, a light detector for photoelectrically detecting light emitted from the image carrier, and an optical head for leading the laser beam emitted from the at least one laser stimulating ray source to the image carrier, irradiating the image carrier with the laser beam and leading light emitted from the image carrier to the light detector, the optical head being constituted so as to lead light emitted from a point of the image carrier located upstream of a point of the image carrier onto which the laser beam impinges with respect to a direction of scanning with the laser beam.

2. An image reading apparatus in accordance with claim 1 wherein the optical head further includes a stimulating ray condensing optical system for condensing a laser beam emitted from the at least one laser stimulating ray source onto the image carrier and a detected light condensing optical system disposed downstream of the stimulating ray condensing optical system with respect to the direction of the scanning with the laser beam for condensing light released from the image carrier and leading it to the light detector.

3. An image reading apparatus in accordance with claim 2 wherein the stimulating ray condensing optical system and the detected light condensing optical system are provided so that their optical axes are parallel.

4. An image reading apparatus in accordance with claim 2 wherein the stimulating ray condensing optical system and the detected light condensing optical system are provided so that their axes lie at a predetermined angle to each other.

5. An image reading apparatus in accordance with claim 3 wherein an aperture is provided between the stimulating ray condensing optical system and the detected light condensing optical system so that the center thereof coincides with the center of the path of light released from the image carrier and only light released from the image carrier and to be detected by the light detector is allowed to pass therethrough.

6. An image reading apparatus in accordance with claim 4 wherein an aperture is provided between the stimulating ray condensing optical system and the detected light condensing optical system so that the center thereof coincides with the center of the path of light released from the image carrier and only light released from the image carrier and to be detected by the light detector is allowed to pass therethrough.

7. An image reading apparatus in accordance with claim 2 wherein an aperture is provided between the stimulating ray condensing optical system and the detected light condensing optical system so that the center thereof coincides with the center of the path of light released from the image carrier and only light released from the image carrier and to be detected by the light detector is allowed to pass therethrough.

8. An image reading apparatus in accordance with claim 1 wherein the optical head further comprises a first mirror for directing a laser beam emitted from at least one laser stimulating ray source to the image carrier, a condensing optical system for condensing light released from the image carrier, a second mirror whose center portion is formed so as to transmit the laser beam and which is adapted for reflecting light condensed by the condensing optical system and leading the light to the light detector and angle adjusting means for adjusting the angle of the first mirror.

9. An image reading apparatus in accordance with claim 8 wherein the second mirror is constituted as a perforated mirror whose center portion is formed with a hole.

10. An image reading apparatus in accordance with claim 9 wherein an aperture is provided between the second mirror and the light detector so that the center thereof coincides with the center of the path of light released from the image carrier and only light released from the image carrier and to be detected by the light detector is allowed to pass therethrough.

11. An image reading apparatus in accordance with claim 8 wherein an aperture is provided between the second mirror and the light detector so that the center thereof coincides with the center of the path of light released from the image carrier and only light released from the image carrier and to be detected by the light detector is allowed to pass therethrough.

12. An image reading apparatus in accordance with claim 1 wherein the optical head further comprises a first mirror for directing a laser beam emitted from at least one laser stimulating ray source to the image carrier, a first condensing optical system for condensing light directed by the first mirror to the image carrier onto the image carrier, a second mirror whose center portion is located on an extension of the path of the laser beam impinging on the first mirror and which is located upstream of the first mirror with respect to the scanning direction of the laser beam and is adapted for directing the laser beam emitted from the at least one laser stimulating ray source to the image carrier, a second condensing optical system located upstream of the first condensing optical system with respect to the scanning direction of the laser beam and adapted for condensing light released from the image carrier, and a third mirror whose center portion is formed so as to transmit the laser beam and which is adapted for reflecting light condensed by the second condensing optical system and leading the light to the light detector, the second mirror being adapted for directing the laser beam emitted from the at least one laser stimulating ray source to the center portion of the third mirror and the center of the second condensing optical system, the optical system further comprising angle adjusting means for adjusting the angle of the first mirror, thereby enabling the first mirror to be selectively located in the path of the laser beam emitted from the at least one laser stimulating ray source or retracted therefrom.

13. An image reading apparatus in accordance with claim 12 wherein the first condensing optical system, the first mirror, the second mirror, the third mirror and the second condensing optical system are disposed so that the optical axis of the first condensing optical system and the optical axis of the second condensing optical system are parallel to each other.

14. An image reading apparatus in accordance with claim 13 wherein an aperture is provided between the third mirror and the light detector so that the center thereof coincides with the center of the path of light released from the image carrier and only light released from the image carrier and to be detected by the light detector is allowed to pass therethrough.

15. An image reading apparatus in accordance with claim 13 wherein the second mirror is constituted as a perforated mirror whose center portion is formed with a hole.

16. An image reading apparatus in accordance with claim 15 wherein an aperture is provided between the third mirror and the light detector so that the center thereof coincides with the center of the path of light released from the image carrier and only light released from the image carrier and to be detected by the light detector is allowed to pass therethrough.

17. An image reading apparatus in accordance with claim 12 wherein the first condensing optical system, the first mirror, the second mirror, the third mirror and the second condensing optical system are disposed so that the optical axis of the first condensing optical system and the optical axis of the second condensing optical system lie at a predetermined angle to each other.

18. An image reading apparatus in accordance with claim 17 wherein the second mirror is constituted as a perforated mirror whose center portion is formed with a hole.

19. An image reading apparatus in accordance with claim 18 wherein an aperture is provided between the third mirror and the light detector so that the center thereof coincides with the center of the path of light released from the image carrier and only light released from the image carrier and to be detected by the light detector is allowed to pass there through.

20. An image reading apparatus in accordance with claim 17 wherein an aperture is provided between the third mirror and the light detector so that the center thereof coincides with the center of the path of light released from the image carrier and only light released from the image carrier and to be detected by the light detector is allowed to pass therethrough.

21. An image reading apparatus in accordance with claim 12 wherein the second mirror is constituted as a perforated mirror whose center portion is formed with a hole.

22. An image reading apparatus in accordance with claim 21 wherein an aperture is provided between the third mirror and the light detector so that the center thereof coincides with the center of the path of light released from the image carrier and only light released from the image carrier and to be detected by the light detector is allowed to pass therethrough.

23. An image reading apparatus in accordance with claim 12 wherein an aperture is provided between the third mirror and the light detector so that the center thereof coincides with the center of the path of light released from the image carrier and only light released from the image carrier and to be detected by the light detector is allowed to pass therethrough.

24. An image reading apparatus in accordance with claim 1 wherein the optical head further comprises a first mirror for reflecting a laser beam emitted from at least one laser stimulating ray source, a condensing optical system for condensing the laser beam reflected by the first mirror onto the image carrier and condensing light released from the image carrier, and a second mirror for reflecting light released from the image carrier and condensed by the condensing optical system and leading it to the light detector, the axis of the laser beam condensed by the condensing optical system and the axis of the light released from the image carrier and condensed by the condensing optical system lying at a predetermined angle to each other.

25. An image reading apparatus in accordance with claim 24 wherein an aperture is provided between the second mirror and the light detector so that the center thereof coincides with the center of the path of light released from the image carrier and only light released from the image carrier and to be detected by the light detector is allowed to pass therethrough.

* * * * *